US012809789B2

(12) United States Patent
Periyapatna Nagendra et al.

(10) Patent No.: US 12,809,789 B2
(45) Date of Patent: Nov. 24, 2026

(54) METHODS, SYSTEMS, APPARATUS, AND ARTICLES OF MANUFACTURE TO UPDATE HEADERS AND SIGNAL AVAILABILITY OF DATA

(71) Applicant: Texas Instruments Incorporated, Dallas, TX (US)

(72) Inventors: Aniruddha Periyapatna Nagendra, Bengaluru (IN); Chirag Sharma, Delhi (IN); Anand Kumar G, Bengaluru (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 98 days.

(21) Appl. No.: 18/768,854

(22) Filed: Jul. 10, 2024

(65) Prior Publication Data

US 2026/0017210 A1 Jan. 15, 2026

(51) Int. Cl.
*G06F 13/10* (2006.01)

(52) U.S. Cl.
CPC .......... *G06F 13/10* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 4,816,996 | A | 3/1989 | Hill | |
| 11,341,081 | B1 * | 5/2022 | Mogensen | G06F 13/122 |
| 2002/0120795 | A1 | 8/2002 | Charlier | |
| 2019/0122007 | A1 * | 4/2019 | Van Antwerpen | G06F 21/602 |

FOREIGN PATENT DOCUMENTS

| | | |
|---|---|---|
| CN | 116737642 A | 9/2023 |

OTHER PUBLICATIONS

Anil D., "Bit Banging Method For SPI/I2C Communication," Texas Instruments, E2E Support Forum, [https://e2e.ti.com/cfs-file/_key/communityserver-discussions-components-files/166/bit-banging.pdf] retrieved on Apr. 12, 2024, 1 page.

Wikipedia, "Bit banging," Wikipedia Foundation, Inc., [https://en.wikipedia.org/w/index.php?title=Bit_banging&oldid=1206290194] retrieved on Apr. 12, 2024, 3 pages.

Wikipedia, "Serial Peripheral Interface," Wikipedia Foundation, Inc., [https://en.wikipedia.org/w/index.php?title=Serial_Peripheral_Interface&oldid=1208724209] retrieved on Apr. 12, 2024, 21 pages.

"TMS320DM646x DMSoC Serial Peripheral Interface (SPI) User's Guide", Mar. 31, 2011, XP055089722, www.ti.com/lit/ug/spruer4b/spruer4b.pdf.

International Search Report for Corresponding Application No. PCT/US2025/036377, mailed Oct. 23, 2025, 4 pages.

* cited by examiner

*Primary Examiner* — Scott C Sun
(74) *Attorney, Agent, or Firm* — Carl G. Peterson; Charles F. Koch

(57) ABSTRACT

An example device includes a peripheral out, controller in (POCI) pin. The device includes a buffer coupled to the POCI pin, wherein the device is configured to: detect a write transaction for a header that is addressed to a register, and cause the header to be written to the buffer in response to detecting the write transaction addressed to the register. Other examples are described.

20 Claims, 13 Drawing Sheets

METHODS, SYSTEMS, APPARATUS, AND ARTICLES OF MANUFACTURE TO UPDATE HEADERS AND SIGNAL AVAILABILITY OF DATA

TECHNICAL FIELD

This description relates generally to communication protocols and, more particularly, to methods, systems, apparatus, and articles of manufacture to update headers and signal availability of data.

BACKGROUND

Embedded systems are computer systems that include a combination of at least one processor, memory, and at least one peripheral device. Embedded systems are often embedded in a larger device that may include at least one of electrical hardware or mechanical parts. For example, embedded systems are commonly found in consumer, industrial, automotive, home appliance, medical, telecommunication, commercial, and aerospace applications.

SUMMARY

For methods, systems, apparatus, and articles of manufacture to update headers and signal availability of data, an example device includes a peripheral out, controller in (POCI) pin. The device includes a buffer coupled to the POCI pin, wherein the device is configured to: detect a write transaction for a header that is addressed to a register, and cause the header to be written to the buffer in response to detecting the write transaction addressed to the register. Other examples are described.

For methods, systems, apparatus, and articles of manufacture to update headers and signal availability of data, an example system includes a controller device. The system includes a communication bus coupled to the controller device, the communication bus comprising at least a chip select (CSN) line, a peripheral clock (PCLK) line, a peripheral in, controller out (PICO) line, and a peripheral out, controller in (POCI) line. The system includes a peripheral device comprising a buffer coupled to the communication bus, wherein the peripheral device is configured to: write a header to the buffer; and transmit a data ready signal to the controller device on a line of the communication bus in response to writing the header to the buffer, the data ready signal to indicate that the header is available. Other examples are described.

For methods, systems, apparatus, and articles of manufacture to update headers and signal availability of data, an example method includes detecting a write transaction for a header that is addressed to a register. The method includes causing the header to be written to a buffer in response to detecting the write transaction addressed to the register, wherein the buffer is coupled to a peripheral out, controller in (POCI) pin. Other examples are described.

Figure 1:
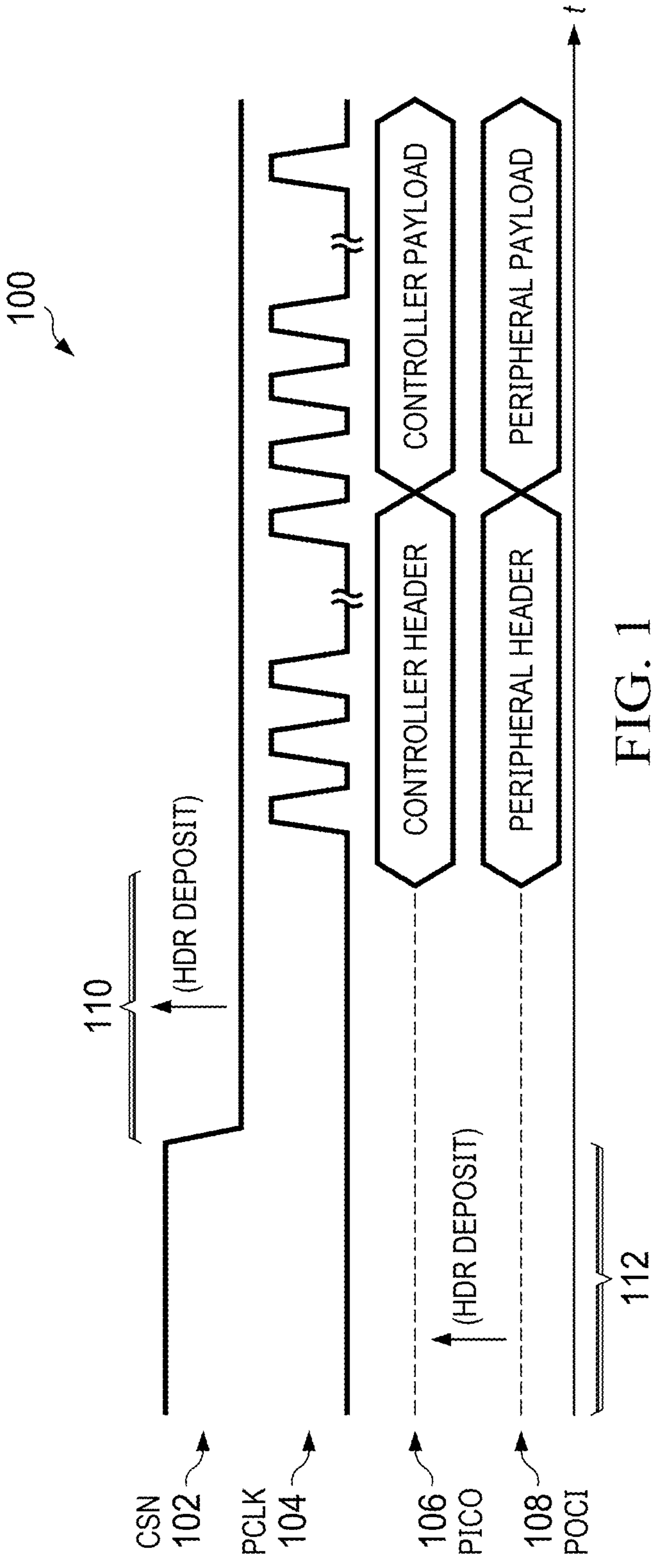
FIG. 1 is a timing diagram illustrating example communication between a controller device and hardware communication circuitry of a peripheral device under the Serial Peripheral Interface protocol.

The drawings are not necessarily to scale. Generally, the same reference numbers in the drawing(s) and this description refer to the same or similar (in terms of at least one of functional or structural) at least one of features or parts. Although the drawings show regions with clean lines and boundaries, some or all of these lines and boundaries may be idealized. In reality, the boundaries or lines may be unobservable, blended, or irregular.

DETAILED DESCRIPTION

Embedded systems use peripheral devices to interact with other devices in an overall system. For example, peripheral devices include input devices (e.g., keyboards, touchscreens, buttons, sensors, etc.), output devices (e.g., displays, speakers, actuators, etc.), interface controllers (e.g., Ethernet, Universal Serial Bus (USB), Bluetooth®, Wi-Fi, etc.), and storage devices (e.g., secure digital (SD) cards, flash memory, solid-state drives (SSDs), etc.). To communicate with peripheral devices, embedded systems utilize one or more communication protocols such as the Universal Asynchronous Receiver Transmitter (UART) protocol, the Serial Peripheral Interface (SPI) protocol, the Inter-Integrated Circuit ($I^2C$) protocol, and the USB protocol.

Under the SPI protocol, embedded systems include at least one controller device and at least one peripheral device. Also, each of the controller device and the peripheral device includes hardware communication circuitry structured to comply with the SPI protocol. Under the SPI protocol, software executing on a peripheral device (e.g., a wireless transceiver) prepares and transmits a header to a controller device (e.g., a microcontroller unit (MCU)) via the hardware communication circuitry on the peripheral device. The header includes information such as a depth of a queue included in the hardware communication circuitry on the peripheral device, a received signal strength indicator (RSSI), and one or more event flags. In some examples, a controller device and a peripheral device are referred to differently. For example, a controller device may be referred to as a master device or a main device. Also, for example, a peripheral device may be referred to as a slave device or a sub device.

FIG. 1 is a timing diagram 100 illustrating example communication between a controller device and hardware communication circuitry of a peripheral device under the SPI protocol. Under the SPI protocol, a controller device and hardware communication circuitry of a peripheral device communicate via a communication bus implemented over four pins: a chip select (CSN) pin, a peripheral clock (PCLK) pin, a peripheral in, controller out (PICO) pin, and a peripheral out, controller in (POCI) pin. In the example of FIG. 1, the timing diagram 100 includes a first example plot 102 representative of a CSN signal at the CSN pin, a second example plot 104 representative of a PCLK signal at the PCLK pin, a third example plot 106 representative of a PICO signal at the PICO pin, and a fourth example plot 108 representative of a POCI signal at the POCI pin. In the example of FIG. 1, the CSN signal is an active low signal (e.g., a logic low value (e.g., 0 volts (0), a zero, etc.) indicates that a peripheral device is selected). Additional example details of the SPI protocol can be found in commonly assigned U.S. Pat. No. 11,341,081, entitled "Propagation Delay Compensation for SPI Interfaces," filed Mar. 10, 2021, which is incorporated by reference in its entirety.

To comply with the SPI protocol, a peripheral device can place the header on the POCI pin during a first example period 110 after the CSN signal goes low (e.g., an active state in which the peripheral device is selected) and before a rising edge of the PCLK signal from a controller device. However, the first period 110 is often short. As such, software executing on the peripheral device may not be able to poll the CSN pin or receive an interrupt when the CSN signal goes low/active with sufficient time to communicate the header to hardware communication circuitry of the peripheral device that is to place the header on the POCI pin during the first period 110.

Alternatively, to comply with the SPI protocol, software executing on a peripheral device can prepare a header and load the header into a transmit queue of the peripheral device during a second example period 112 while the CSN signal is high (e.g., an inactive state in which the peripheral device is not selected). However, the second period 112 can be as short as one cycle of the PCLK signal. That is, the CSN signal may transition to active as little as one clock cycle after transitioning inactive. As such, it is difficult for software executing on the peripheral device to poll the CSN pin or receive an interrupt when the CSN signal goes high/inactive with sufficient time to communicate the header to hardware communication circuitry of the peripheral device that is to place the header on the POCI pin during the second period 112.

To avoid these issues and provide more flexibility for controlling the timing between the CSN signal and the PCLK signal, many times developers on SPI compliant embedded systems utilize software to control transmission of headers from a peripheral device to a controller device. For example, many SPI compliant controller devices utilize a bit banging method to control header transmission instead of utilizing SPI hardware communication circuitry. By utilizing software to control timing instead of hardware, a programmer of a controller device can ensure that there is sufficient time for a peripheral device to provide the header after the CSN signal is pulled low/active. However, to utilize software instead of hardware, software executing on a controller device must be customized to cooperate with at least one of software executing on or hardware of a peripheral device. Also, utilizing software to control timing results in the hardware communication circuitry of at least the controller device being unused.

Furthermore, a programmer of software executing on a peripheral device may want to configure the software to refresh the header (e.g., provide an update header, provide the latest header, etc.) before communicating the header to a controller device. However, utilizing software to control transmission of a header to a control device may consume 20 processor clock cycles for each refresh due to multiple operations involved in the sequence (e.g., flushing a transmit queue to clear an outdated header, writing a new header to the transmit queue, etc.). Also, there is no hardware-based approach for a peripheral device to signal that data is available for a controller device.

For example, under the SPI protocol, input, output (I/O) pins of peripheral device hardware communication circuitry (e.g., the POCI pin and the PICO pin) are tri-stated (e.g., in a high impedance state) when the CSN signal is inactive. Instead, peripheral device software utilizes a general-purpose input output (GPIO) pin of the peripheral device to signal the availability of a header. However, utilizing a GPIO pin is not viable for low pin count devices. For example, embedded systems often have few GPIO pins and using one pin for purposes of signaling the availability of a header is expensive (e.g., in that the pin is no longer available for some other function related to a peripheral device which may limit the functionality of the peripheral device). Furthermore, utilizing peripheral device software to signal the availability of a header via a GPIO pin consumes processor bandwidth.

Examples described herein include methods, systems, apparatus, and articles of manufacture to update headers and signal availability of data. Described examples include a complete hardware-based approach in hardware communication circuitry for atomic header update operation. For example, once a header value is written to a transmit queue of hardware communication circuitry of a peripheral device, the hardware communication circuitry signals a controller device. As such, the peripheral device performs one or a few software operations to provide a header value to hardware communication circuitry as opposed to the many software operations of other approaches.

Example hardware communication circuitry described herein can refresh a header value any number of times until communication starts with a controller device. Such operations are performed in hardware (e.g., without software overhead). Examples described herein signal the availability of data to a controller device. For example, described examples can be implemented with four pins (e.g., a CSN pin, a PCLK pin, a PICO pin, and a POCI pin) or with five pins (e.g., a CSN pin, a PCLK pin, a PICO pin, a POCI pin, and a dedicated interrupt (INT) pin). Examples described herein can also drive data on the POCI pin when the period of inactivity on the CSN pin is very short (e.g., one or a few cycles of the PCLK signal).

Figure 2:
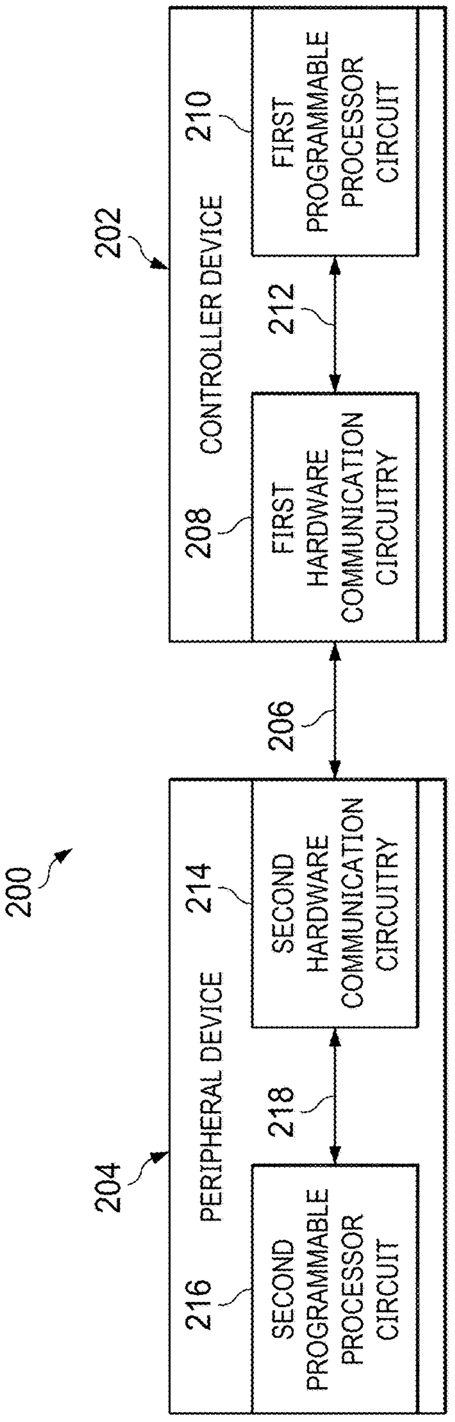
FIG. 2 is a block diagram of an example communication system including an example controller device and an example peripheral device.

FIG. 2 is a block diagram of an example communication system 200 including an example controller device 202 and an example peripheral device 204. In the example of FIG. 2, the controller device 202 and the peripheral device 204 are in communication via an example communication bus 206. Also, in the example of FIG. 2, the controller device 202 is implemented by an integrated circuit (IC) such as a System on a Chip (SoC). For example, the controller device 202 is implemented by an MCU including first example hardware communication circuitry 208 and a first example programmable processor circuit 210.

In the illustrated example of FIG. 2, the first hardware communication circuitry 208 is implemented by at least one of analog circuitry or digital circuitry. Also, the first programmable processor circuit 210 of FIG. 2 is implemented by a programmable processor such as a central processor unit (CPU), a graphics processor unit (GPU), or a digital signal processor (DSP). In the example of FIG. 2, the first hardware communication circuitry 208 and the first programmable processor circuit 210 are in communication via a first example on-chip interconnect bus 212. For example, the first on-chip interconnect bus 212 is implemented in compliance with the Advanced Peripheral Bus (APB) protocol. Also or alternatively, the first on-chip interconnect bus 212 is implemented in compliance with at least one of the CoreConnect protocol, the Wishbone protocol, the Open Core Protocol (OCP), the IPbus protocol, or the Nios II protocol. In some examples, the first on-chip interconnect bus 212 may be implemented using at least one of any suitable wired or any suitable wireless communication.

In the illustrated example of FIG. 2, the peripheral device 204 is implemented by an IC such as an SoC. For example, the peripheral device 204 is implemented by a wireless transceiver including second example hardware communication circuitry 214 and a second example programmable processor circuit 216. In the example of FIG. 2, the second hardware communication circuitry 214 is implemented by at least one of analog circuitry or digital circuitry. Also, the second programmable processor circuit 216 of FIG. 2 is implemented by a programmable processor such as a CPU, a GPU, or a DSP. In the example of FIG. 2, the second hardware communication circuitry 214 and the second programmable processor circuit 216 are in communication via a second example on-chip interconnect bus 218. For example, the second on-chip interconnect bus 218 is implemented in compliance with the APB protocol. Also or alternatively, the second on-chip interconnect bus 218 is implemented in compliance with at least one of the CoreConnect protocol, the Wishbone protocol, the OCP, the IPbus protocol, or the Nios II protocol. In some examples, the second on-chip interconnect bus 218 may be implemented using at least one of any suitable wired or any suitable wireless communication.

As described above, the controller device 202 and the peripheral device 204 are in communication via the communication bus 206. In particular, the first hardware communication circuitry 208 of the controller device 202 and the second hardware communication circuitry 214 of the peripheral device 204 are in communication via the communication bus 206. In the example of FIG. 2, the communication bus 206 is implemented in compliance with the SPI protocol. Also or alternatively, the communication bus 206 is implemented in compliance with at least one of the UART protocol, the $I^2C$ protocol, or the USB protocol. In examples described herein, the communication bus 206 may be implemented using at least one of any suitable wired or any suitable wireless communication.

Figure 3:
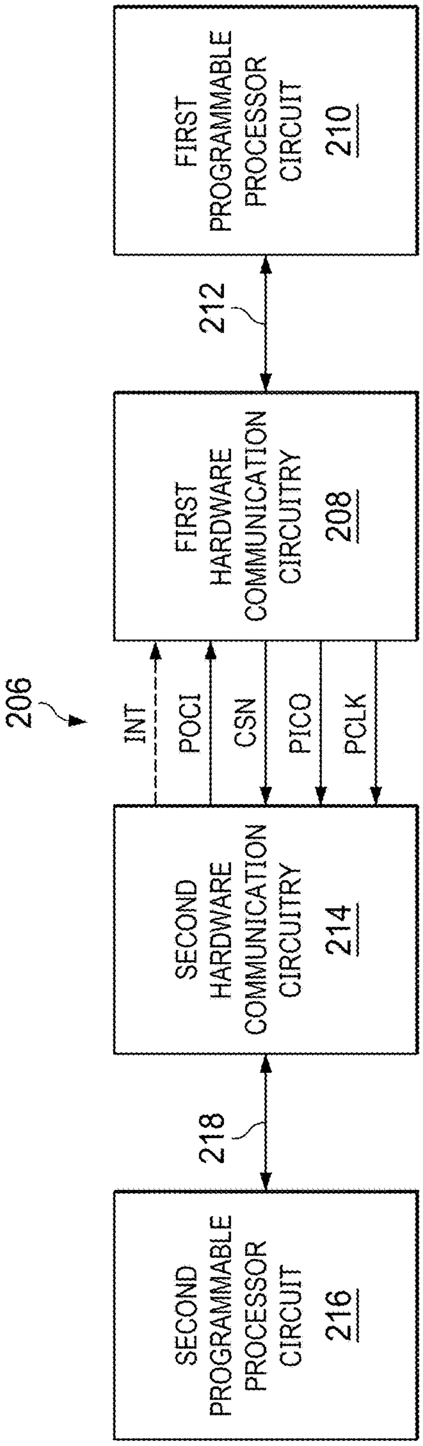
FIG. 3 is a block diagram of an example implementation of the communication bus between the first hardware communication circuitry and the second hardware communication circuitry of FIG. 2.

FIG. 3 is a block diagram of an example implementation of the communication bus 206 between the first hardware communication circuitry 208 and the second hardware communication circuitry 214 of FIG. 2. For example, the communication bus 206 can be implemented with four pins or five pins (also referred to as terminals). In a four-pin implementation, the communication bus 206 includes a CSN pin, a PCLK pin, a PICO pin, and a POCI pin. In a five-pin implementation, the communication bus 206 includes a CSN pin, a PCLK pin, a PICO pin, a POCI pin, and an INT pin. In some examples, at least one of the CSN pin, the PCLK pin, the PICO pin, the POCI pin, or the INT pin is referred to as a CSN line, a PCLK line, a PICO line, a POCI line, or an INT line, respectively.

Returning to FIG. 2, when the peripheral device 204 has data to send to the controller device 202, the second programmable processor circuit 216 loads a transmit queue of the second hardware communication circuitry 214 with a header of a packet as described herein. Based on receiving the header, the second hardware communication circuitry 214 signals the availability of the header to the first hardware communication circuitry 208. For example, in a four-pin implementation of the communication bus 206, the second hardware communication circuitry 214 signals the availability of data (e.g., the header) to the first hardware communication circuitry 208 on the POCI pin. Also, in a five-pin implementation of the communication bus 206, the second hardware communication circuitry 214 signals the availability of the header to the first hardware communication circuitry 208 on the INT pin (e.g., the interrupt pin).

In the illustrated example of FIG. 2, based on a signal of available data from the second hardware communication circuitry 214, the first hardware communication circuitry 208 selects the peripheral device 204 (e.g., by pulling the CSN pin for the peripheral device 204 low) to begin communication. During each clock cycle on the PCLK pin, the first hardware communication circuitry 208 sends a bit to the second hardware communication circuitry 214 on the PICO pin and the second hardware communication circuitry 214 reads the incoming bit. Also, during each clock cycle of the PCLK pin, the second hardware communication circuitry 214 sends a bit to the first hardware communication circuitry 208 on the POCI pin and the first hardware communication circuitry 208 reads the corresponding incoming bit.

In the illustrated example of FIG. 2, each of the first hardware communication circuitry 208 and the second hardware communication circuitry 214 includes a shift register. For example, each shift register has a given word size of 8 bits. In the example of FIG. 2, when a device sends data (e.g., on the POCI pin, on the PICO pin, etc.), the device shifts data out of the shift register starting with the most significant bit (MSB) of the shift register. Also, when a device receives data (e.g., on the POCI pin, on the PICO pin, etc.), the device shifts data into the shift register starting with the least significant bit (LSB) of the shift register.

In the illustrated example of FIG. 2, on the rising edge of the PCLK signal (e.g., a first rising edge), the first hardware communication circuitry 208 shifts a bit out of the shift register and sends the bit to the second hardware communication circuitry 214 on the PICO pin. Also, on the rising edge of the PCLK signal (e.g., the first rising edge), the second hardware communication circuitry 214 shifts a bit out of the shift register and sends the bit to the first hardware communication circuitry 208 on the POCI pin. On the next falling edge of the PCLK signal (e.g., a first falling edge), the first hardware communication circuitry 208 samples the POCI pin to read the bit sent from the second hardware communication circuitry 214 and stores the bit in the shift register as the new LSB. Also, on the next falling edge of the PCLK signal (e.g., the first falling edge), the second hardware communication circuitry 214 samples the PICO pin to read the bit sent from the first hardware communication circuitry 208 and stores the bit in the shift register as the new LSB. In some examples, the transmitting device (e.g., the peripheral device from the perspective of the controller device, the controller device from the perspective of the peripheral device, etc.) transmits data on the falling edges of the PCLK signal and the receiving device samples the signal on the rising edges of the PCLK signal.

In the illustrated example of FIG. 2, the first hardware communication circuitry 208 and the second hardware communication circuitry 214 continue communicating until the bits have been shifted into or out of the respective shift registers. In the example of FIG. 2, communication between the first hardware communication circuitry 208 and the second hardware communication circuitry 214 may continue communicating for any number of clock cycles. After the first hardware communication circuitry 208 receives the header and payload of a packet from the second hardware communication circuitry 214, the first hardware communication circuitry 208 stops toggling the PCLK signal and deselects the CSN signal for the peripheral device 204. When deselected, the second hardware communication circuitry 214 disregards signals received on the PCLK pin and the PICO pin. Also, in a five-pin implementation of the communication bus 206, the second hardware communication circuitry 214 tri-states the POCI pin when deselected to prevent contention. In a four-pin implementation of the communication bus 206, the second hardware communication circuitry 214 does not tri-state the POCI pin when deselected as described below.

Figure 4:
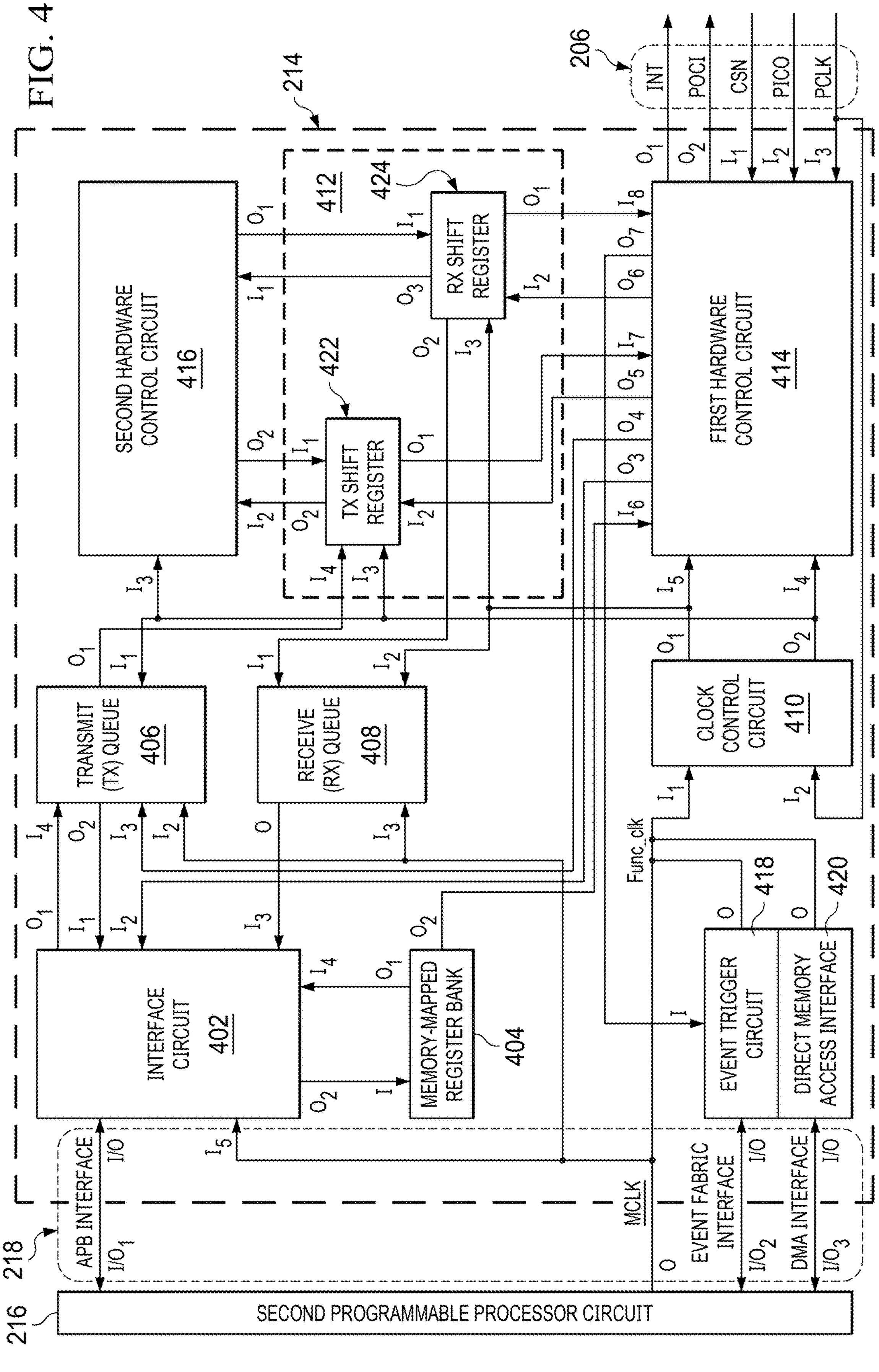
FIG. 4 is a block diagram of an example implementation of the second hardware communication circuitry of FIG. 2.

FIG. 4 is a block diagram of an example implementation of the second hardware communication circuitry 214 of FIG. 2. In the example of FIG. 4, the second hardware communication circuitry 214 includes an example interface circuit 402, an example memory-mapped register (MMR) bank 404, an example transmit queue 406, an example receive queue 408, an example clock control circuit 410, example shift registers 412, a first example hardware control circuit 414, a second example hardware control circuit 416, an example event trigger circuit 418, and an example direct memory access (DMA) interface 420. Also, the shift registers 412 include an example transmit shift register 422 and an example receive shift register 424.

In the illustrated example of FIG. 4, the second hardware communication circuitry 214 may be instantiated (e.g., creating an instance of, bring into being for any length of time, materialize, implement, etc.) by (i) an Application Specific Integrated Circuit (ASIC) or (ii) a Field Programmable Gate Array (FPGA) structured or configured in response to execution of instructions to perform operations. Some or all of the circuitry of FIG. 4 may, thus, be instantiated at the same or different times. Also or alternatively, the second hardware communication circuitry 214 of FIG. 4 may be instantiated (e.g., creating an instance of, bring into being for any length of time, materialize, implement, etc.) by programmable circuitry such as a Central Processor Unit (CPU) executing first instructions. Some or all of the circuitry of FIG. 4 may be instantiated, for example, in one or more threads executing concurrently on hardware or in series on hardware.

In the illustrated example of FIG. 4, the interface circuit 402 has a first input terminal, a second input terminal, a third input terminal, a fourth input terminal, a fifth input terminal, a first output terminal, a second output terminal, and an I/O terminal. In the example of FIG. 4, the MMR bank 404 has an input terminal, a first output terminal, and a second output terminal. Also, the transmit queue 406 has a first input terminal, a second input terminal, a third input terminal, a fourth input terminal, a first output terminal, and a second output terminal.

In the illustrated example of FIG. 4, the receive queue 408 has a first input terminal, a second input terminal, a third input terminal, and an output terminal. In the example of FIG. 4, the clock control circuit 410 has a first input terminal, a second input terminal, a first output terminal, and a second output terminal. Also, the first hardware control circuit 414 has a first input terminal, a second input terminal, a third input terminal, a fourth input terminal, a fifth input terminal, a sixth input terminal, a seventh input terminal, and an eighth input terminal.

In the illustrated example of FIG. 4, the first hardware control circuit 414 has a first output terminal, a second output terminal, a third output terminal, a fourth output terminal, a fifth output terminal, a sixth output terminal, and a seventh output terminal. In the example of FIG. 4, the second hardware control circuit 416 has a first input terminal, a second input terminal, a third input terminal, a first output terminal, and a second output terminal. Also, the event trigger circuit 418 has an input terminal, an output terminal, and an I/O terminal. In the example of FIG. 4, the DMA interface 420 has an output terminal and an I/O terminal.

In the illustrated example of FIG. 4, the transmit shift register 422 has a first input terminal, a second input terminal, a third input terminal, a fourth input terminal, a first output terminal, and a second output terminal. In the example of FIG. 4, the receive shift register 424 has a first input terminal, a second input terminal, a third input terminal, a first output terminal, a second output terminal, and a third output terminal. Also, the second programmable processor circuit 216 has an output terminal, a first I/O terminal, a second I/O terminal, and a third I/O terminal. In the example of FIG. 4, one or more of the components of FIG. 4 may include one or more terminals than those illustrated in FIG. 4. For example, each terminal illustrated in FIG. 4 may, in reality, be implemented by more than one terminal.

In the illustrated example of FIG. 4, the interface circuit 402 is implemented by at least one of analog circuitry or digital circuitry. In the example of FIG. 4, the first input terminal of the interface circuit 402 is coupled to the second output terminal of the transmit queue 406, the second input terminal of the interface circuit 402 is coupled to the third output terminal of the first hardware control circuit 414, and the third input terminal of the interface circuit 402 is coupled to the output terminal of the receive queue 408. Also, the fourth input terminal of the interface circuit 402 is coupled to the first output terminal of the MMR bank 404 and the fifth input terminal of the interface circuit 402 is coupled to the output terminal of the second programmable processor circuit 216.

In the illustrated example of FIG. 4, the first output terminal of the interface circuit 402 is coupled to the fourth input terminal of the transmit queue 406 and the second output terminal of the interface circuit 402 is coupled to the input terminal of the MMR bank 404. Also, the I/O terminal of the interface circuit 402 is coupled to the first I/O terminal of the second programmable processor circuit 216. In the example of FIG. 4, the MMR bank 404 is implemented by at least one of analog circuitry or digital circuitry. For example, the MMR bank 404 is implemented by one or more flip-flops and control logic circuitry. In the example of FIG. 4, the input terminal of the MMR bank 404 is coupled to the second output terminal of the interface circuit 402.

In the illustrated example of FIG. 4, the first output terminal of the MMR bank 404 is coupled to the fourth input terminal of the interface circuit 402 and the second output terminal of the MMR bank 404 is coupled to the sixth input terminal of the first hardware control circuit 414. In the example of FIG. 4, the transmit queue 406 is implemented by at least one of analog circuitry or digital circuitry. For example, the transmit queue 406 is implemented by one or more flip-flops. In some examples, the transmit queue 406 is implemented by static random access memory (SRAM). In the example of FIG. 4, the transmit queue 406 implements a first in, first out (FIFO) queue. In some examples, the transmit queue 406 is referred to as a transmit buffer.

In the illustrated example of FIG. 4, the first input terminal of the transmit queue 406 is coupled to the second output terminal of the clock control circuit 410 and the second input terminal of the transmit queue 406 is coupled to the output terminal of the second programmable processor circuit 216. In the example of FIG. 4, the third input terminal of the transmit queue 406 is coupled to the fourth output terminal of the first hardware control circuit 414 and the fourth input terminal of the transmit queue 406 is coupled to the first output terminal of the interface circuit 402. Also, the first output terminal of the transmit queue 406 is coupled to the fourth input terminal of the transmit shift register 422 and the second output terminal of the transmit queue 406 is coupled to the first input terminal of the interface circuit 402.

In the illustrated example of FIG. 4, the receive queue 408 is implemented by at least one of analog circuitry or digital circuitry. For example, the receive queue 408 is implemented by one or more flip-flops. In some examples, the receive queue 408 is implemented by SRAM. In the example of FIG. 4, the receive queue 408 implements a FIFO queue. In some examples, the receive queue 408 is referred to as a receive buffer. In the example of FIG. 4, the first input terminal of the receive queue 408 is coupled to the second output terminal of the receive shift register 424, the second input terminal of the receive queue 408 is coupled to the first output terminal of the clock control circuit 410, and the third input terminal of the receive queue 408 is coupled to the output terminal of the second programmable processor circuit 216. Also, the output terminal of the receive queue 408 is coupled to the third input terminal of the interface circuit 402.

In the illustrated example of FIG. 4, the clock control circuit 410 is implemented by at least one of analog circuitry or digital circuitry. In the example of FIG. 4, the first input terminal of the clock control circuit 410 is coupled to the output terminal of the second programmable processor circuit 216, the output terminal of the event trigger circuit 418, and the output terminal of the DMA interface 420. Also, the second input terminal of the clock control circuit 410 is coupled to third input terminal of the first hardware control circuit 414 (e.g., the PCLK pin of the communication bus 206).

In the illustrated example of FIG. 4, the first output terminal of the clock control circuit 410 is coupled to the second input terminal of the receive queue 408, the fifth input terminal of the first hardware control circuit 414, and the third input terminal of the receive shift register 424. In the example of FIG. 4, the second output terminal of the clock control circuit 410 is coupled to the first input terminal of the transmit queue 406 and the fourth input terminal of the first hardware control circuit 414. Also, the second output terminal of the clock control circuit 410 is coupled to the third input terminal of the second hardware control circuit 416 and the third input terminal of the transmit shift register 422.

In the illustrated example of FIG. 4, the first hardware control circuit 414 is implemented by at least one of analog circuitry or digital circuitry. For example, the first hardware control circuit 414 is implemented by a finite state machine. In the example of FIG. 4, the first input terminal of the first hardware control circuit 414 corresponds to the CSN pin of the communication bus 206, the second input terminal of the first hardware control circuit 414 corresponds to the PICO pin of the communication bus 206, and the third input terminal of the first hardware control circuit 414 corresponds to the PCLK pin of the communication bus 206.

In the illustrated example of FIG. 4, the fourth input terminal of the first hardware control circuit 414 is coupled to the second output terminal of the clock control circuit 410, the fifth input terminal of the first hardware control circuit 414 is coupled to the first output terminal of the clock control circuit 410, and the sixth input terminal of the first hardware control circuit 414 is coupled to the second output terminal of the MMR bank 404. In the example of FIG. 4, the seventh input terminal of the first hardware control circuit 414 is coupled to the first output terminal of the transmit shift register 422 and the eighth input terminal of the first hardware control circuit 414 is coupled to the first output terminal of the receive shift register 424. Also, the first output terminal of the first hardware control circuit 414 corresponds to the INT pin of the communication bus 206 and the second output terminal of the first hardware control circuit 414 corresponds to the POCI pin of the communication bus 206.

In the illustrated example of FIG. 4, the third output terminal of the first hardware control circuit 414 is coupled to the second input terminal of the interface circuit 402. In the example of FIG. 4, the fourth output terminal of the first hardware control circuit 414 is coupled to the third input terminal of the transmit queue 406. Also, the fifth output terminal of the first hardware control circuit 414 is coupled to the second input terminal of the transmit shift register 422. In the example of FIG. 4, the sixth output terminal of the first hardware control circuit 414 is coupled to the second input terminal of the receive shift register 424 and the seventh output terminal of the first hardware control circuit 414 is coupled to the input terminal of the event trigger circuit 418.

In the illustrated example of FIG. 4, the second hardware control circuit 416 is implemented by at least one of analog circuitry or digital circuitry. For example, the second hardware control circuit 416 is implemented by a finite state machine to operate in compliance with a communication protocol (e.g., the SPI protocol) when the second hardware communication circuitry 214 is implemented in a controller device. In the example of FIG. 4, the first input terminal of the second hardware control circuit 416 is coupled to the third output terminal of the receive shift register 424. Also, the second input terminal of the second hardware control circuit 416 is coupled to the second output terminal of the transmit shift register 422.

In the illustrated example of FIG. 4, the third input terminal of the second hardware control circuit 416 is coupled to the second output terminal of the clock control circuit 410. In the example of FIG. 4, the first output terminal of the second hardware control circuit 416 is coupled to the first input terminal of the receive shift register 424. Also, the second output terminal of the second hardware control circuit 416 is coupled to the first input terminal of the transmit shift register 422.

In the illustrated example of FIG. 4, the event trigger circuit 418 is implemented by at least one of analog circuitry or digital circuitry. In the example of FIG. 4, the input terminal of the event trigger circuit 418 is coupled to the seventh output terminal of the first hardware control circuit 414. Also, the output terminal of the event trigger circuit 418 is coupled to the first input terminal of the clock control circuit 410. In the example of FIG. 4, the I/O terminal of the event trigger circuit 418 is coupled to the second I/O terminal of the second programmable processor circuit 216.

In the illustrated example of FIG. 4, the DMA interface 420 is implemented by at least one of analog circuitry or digital circuitry. In the example of FIG. 4, the output terminal of the DMA interface 420 is coupled to the first input terminal of the clock control circuit 410. Also, the I/O terminal of the DMA interface 420 is coupled to the third I/O terminal of the second programmable processor circuit 216.

As described above, the shift registers 412 include the transmit shift register 422 and the receive shift register 424. In the example of FIG. 4, the transmit shift register 422 is implemented by at least one of analog circuitry or digital circuitry. For example, the transmit shift register 422 is implemented by one or more flip-flops. In the example of FIG. 4, the first input terminal of the transmit shift register 422 is coupled to the second output terminal of the second hardware control circuit 416. Also, the second input terminal of the transmit shift register 422 is coupled to the fifth output terminal of the first hardware control circuit 414.

In the illustrated example of FIG. 4, the third input terminal of the transmit shift register 422 is coupled to the second output terminal of the clock control circuit 410. In the example of FIG. 4, the fourth input terminal of the transmit shift register 422 is coupled to the first output terminal of the transmit queue 406. Also, the first output terminal of the transmit shift register 422 is coupled to the seventh input terminal of the first hardware control circuit 414 and the second output terminal of the transmit shift register 422 is coupled to the second input terminal of the second hardware control circuit 416.

In the illustrated example of FIG. 4, the receive shift register 424 is implemented by at least one of analog circuitry or digital circuitry. For example, the receive shift register 424 is implemented by one or more flip-flops. In the example of FIG. 4, the first input terminal of the receive shift register 424 is coupled to the first output terminal of the second hardware control circuit 416. Also, the second input terminal of the receive shift register 424 is coupled to the sixth output terminal of the first hardware control circuit 414.

In the illustrated example of FIG. 4, the third input terminal of the receive shift register 424 is coupled to the first output terminal of the clock control circuit 410. In the example of FIG. 4, the first output terminal of the receive shift register 424 is coupled to the eighth input terminal of the first hardware control circuit 414. Also, the second output terminal of the receive shift register 424 is coupled to the first input terminal of the receive queue 408. In the example of FIG. 4, the third output terminal of the receive shift register 424 is coupled to the first input terminal of the second hardware control circuit 416.

In the illustrated example of FIG. 4, the interface circuit 402 operates as an interface between the second hardware communication circuitry 214 and the second programmable processor circuit 216 of the peripheral device 204 of FIG. 2. For example, the interface circuit 402 communicates with the second programmable processor circuit 216 in compliance with a protocol such as the APB protocol. Also or alternatively, the interface circuit 402 communicates with the second programmable processor circuit 216 in compliance with at least one of the CoreConnect protocol, the Wishbone protocol, the OCP, the IPbus protocol, or the Nios II protocol.

In the illustrated example of FIG. 4, the second programmable processor circuit 216 can write data to the second hardware communication circuitry 214 to communicate the data to the controller device 202. For example, to communicate data to the controller device 202, the second programmable processor circuit 216 issues one or more write transactions for at least one of a header or a payload to the second hardware communication circuitry 214. In the example of FIG. 4, the interface circuit 402 monitors the second on-chip interconnect bus 218 for a write transaction. Based on receiving a write transaction, the interface circuit 402 determines an address included in the write transaction.

In the illustrated example of FIG. 4, if the write transaction is addressed to the transmit queue 406, the interface circuit 402 causes storage of the data in the transmit queue 406. If the write transaction is addressed to a register in the MMR bank 404, the interface circuit 402 cause storage of the data in the register. For example, the MMR bank 404 includes one or more registers to store configuration data for the second hardware communication circuitry 214. Also, the MMR bank 404 includes a virtual register reserved for a header. In the example of FIG. 4, the address of the virtual register is an aliased address (e.g., there is no physical storage to hold data addressed to the virtual register). For example, the MMR bank 404 does not include any flip-flops to store a header addressed to the virtual register (e.g., to save area on chip).

In examples described herein, the virtual register is a 32-bit virtual register. For example, the virtual register supports headers of up to 32 bits (e.g., 8-bits, 16-bits, 24-bits, and 32-bits). Table 1 below illustrates example fields of a 32-bit header.

TABLE 1

| Bit | Field | Description |
|---|---|---|
| 0 | CRDY | Chip ready |
| 1 | DRDY | Data ready |
| 2 | ERROR | Identifier mismatch error |
| 3 | RES0 | Reserved |
| 4:7 | FREE | Number of free locations in the receive queue 408 |
| 8:15 | TRLEN | Transaction length |
| 16:19 | HOSTID_RX | Sequence number of last received valid transaction |
| 20:23 | TRXID_TX | Sequence number of transmitted transaction |
| 24:31 | RES1 | Reserved |

In the example of FIG. 4, the MMR bank 404 also includes registers to store an enabled flag for the virtual register, a commit flag for the virtual register, an ignore flag for the virtual register, and an idle value. For example, the enabled flag indicates whether a header has been written to the virtual register. In the example of FIG. 4, the enabled flag is set to “0” when a header has not been written to the virtual register. Also, the enabled flag is set to “1” when a header has been written to the virtual register. In the example of FIG. 4, the commit flag indicates whether the header is committed.

For example, when a header is committed, the second programmable processor circuit 216 cannot overwrite the header. By default, the commit flag is not set (e.g., is "0", is inactive, etc.) when the CSN signal is inactive. In the example of FIG. 4, the ignore flag indicates whether a header addressed to the virtual register was written to the transmit queue 406. For example, the ignore flag is set to "0" to indicate that a header addressed to the virtual register was written to the transmit queue 406. Also, the ignore flag is set to "1" to indicate that a header addressed to the virtual register was not written to the transmit queue 406. In the example of FIG. 4, the idle value is a programmed (e.g., configured) value that is to be transmitted on the POCI pin in the absence of data sent from the second programmable processor circuit 216.

In the illustrated example of FIG. 4, the second programmable processor circuit 216 determines whether to write a header to the second hardware communication circuitry 214 based on whether the commit flag is set for the virtual register. For example, based on the commit flag not being set, the second programmable processor circuit 216 can write the header to the second hardware communication circuitry 214. In examples described herein, software executing on the second programmable processor circuit 216 can write a header to the virtual register one or more times as long as commit flag is not set (e.g., is "0"). In the example of FIG. 4, the second programmable processor circuit 216 issues a write transaction for the header where the write transaction is addressed to the virtual register of the second hardware communication circuitry 214.

In the illustrated example of FIG. 4, based on receiving a write transaction addressed to the virtual register, the interface circuit 402 notifies the MMR bank 404 of the write transaction. Based on the write transaction addressed to the virtual register, the MMR bank 404 notifies the first hardware control circuit 414 of the write transaction. In the example of FIG. 4, the first hardware control circuit 414 checks the value of the commit flag in the MMR bank 404 (e.g., via the interface circuit 402). If the commit flag is set, then the first hardware control circuit 414 sets the ignore flag in the MMR bank 404 (e.g., via the interface circuit 402).

In the illustrated example of FIG. 4, if the commit flag is not set, then the first hardware control circuit 414 transmits a signal to the transmit queue 406 to clear the transmit queue 406. Also, if the commit flag is not set, then the first hardware control circuit 414 causes the interface circuit 402 to transfer the header directly from the second on-chip interconnect bus 218 to the transmit queue 406. For example, when data is written to the aliased address of the virtual register, the interface circuit 402 holds (e.g., wait states) the second on-chip interconnect bus 218 for a few clock cycles (e.g., three clock cycles) while the first hardware control circuit 414 clears the transmit queue 406 and causes the interface circuit 402 to transfer the data from the second on-chip interconnect bus 218 to aliased address in the transmit queue 406. Advantageously, processing to clear the transmit queue 406 and load the header into the transmit queue 406 is completed in 5 clock cycles of the second on-chip interconnect bus 218 (e.g., less clock cycles than consumed by software-based techniques to write a header (e.g., 20 clock cycles)).

Contemporaneously (e.g., simultaneously) with loading of the header into the transmit queue 406, the first hardware control circuit 414 transmits (e.g., drives) a data ready signal to the controller device 202. For example, when the second programmable processor circuit 216 writes a header to the virtual register of the MMR bank 404, the first hardware control circuit 414 drives the data ready signal (e.g., bit-1 of the header) on the POCI pin. As such, the data ready signal is transmitted on the communication bus 206 while the second on-chip interconnect bus 218 is wait stated and the remainder of the header is transferred from the second on-chip interconnect bus 218 to the transmit queue 406 over the next five clock cycles. In this manner, the first hardware communication circuitry 208 of the controller device 202 is informed (e.g., at the earliest possible time) about the availability of data at the peripheral device 204 when header is written.

In a four-pin implementation of the communication bus 206, the first hardware control circuit 414 transmits the data ready signal (e.g., bit one of the header of Table 1) on the POCI pin of the communication bus 206. Also, in a five-pin implementation of the communication bus 206, the first hardware control circuit 414 transmits the data ready signal (e.g., bit one of the header of Table 1) on the INT pin of the communication bus 206. In examples described herein, the polarity of the data ready signal is configurable (e.g., by software executing on the second programmable processor circuit 216). Advantageously, by setting the data ready signal when the header is written to the transmit queue 406, the first hardware control circuit 414 signals the availability of data to the controller device 202. As such, the controller device 202 can quickly sense the data ready signal from the peripheral device 204 (e.g., on the INT pin or on POCI pin) and pull the CSN pin low to start data transfer between the controller device 202 and the peripheral device 204.

In the illustrated example of FIG. 4, the first hardware control circuit 414 also monitors the communication bus 206 for a CSN signal from the controller device 202. If the CSN signal has been asserted (e.g., pulled low) for the peripheral device 204, the first hardware control circuit 414 sets the commit flag in the MMR bank 404 (e.g., via the interface circuit 402). In the example of FIG. 4, the first hardware control circuit 414 sets the commit flag to "1" which indicates that the header written to the virtual register (and stored in the transmit queue 406) is committed and any update will be ignored while the commit flag is set. As such, the second programmable processor circuit 216 can monitor the commit flag (e.g., for the CSN high to low transition interrupt) to determine when to write a corresponding payload to the second hardware communication circuitry 214.

In the illustrated example of FIG. 4, if software executing on the second programmable processor circuit 216 writes a new header to the virtual register while the commit flag is set (e.g., to "1"), then the first hardware control circuit 414 rejects the new header. For example, the first hardware control circuit 414 does not cause the interface circuit 402 to transfer the new header to the transmit queue 406. Also, if the first hardware control circuit 414 ignores a header, then the first hardware control circuit 414 sets the ignore flag (e.g., to "1") to indicate to software executing on the second programmable processor circuit 216 that the header was not written to the transmit queue 406. Advantageously, the peripheral device 204 synchronizes the CSN signal to avoid race conditions between the CSN signal and the POCI signal. For example, when software executing on the second programmable processor circuit 216 writes a header to the second hardware communication circuitry 214 at the same time as the CSN signal being asserted, the second hardware communication circuitry 214 clock synchronizes the CSN signal to avoid such race conditions between the POCI signal being driven at the same time as the CSN signal is asserted. As such, the second programmable processor circuit 216 can reliably write the header to the transmit queue 406 even when the CSN signal is asserted at the same time the header is updated.

In the illustrated example of FIG. 4, when the commit flag is set, the interface circuit 402 monitors the second on-chip interconnect bus 218 for a second write transaction for a payload corresponding to the header. When the second programmable processor circuit 216 is to refresh the header multiple times prior to start of communication, then the second programmable processor circuit 216 waits to write the corresponding payload to the second hardware communication circuitry 214 until the commit flag is set (e.g., sensed through CSN high to low transition interrupt as described below). As such, the payload will not be cleared when the transmit queue 406 is cleared (e.g., by the first hardware control circuit 414) each time a new header is written by the second programmable processor circuit 216. In the example of FIG. 4, based on receiving the payload, the interface circuit 402 causes storage of the payload in the transmit queue 406.

In the illustrated example of FIG. 4, the transmit queue 406 implements a FIFO queue as described above. In the example of FIG. 4, the transmit queue 406 operates based on a clock signal from at least one of the second programmable processor circuit 216 or the clock control circuit 410. Also, the transmit queue 406 transfers data (e.g., a header, a payload, etc.) to the transmit shift register 422. In the example of FIG. 4, the transmit shift register 422 shifts data into and/out of the transmit shift register 422 based on a clock signal from the clock control circuit 410. For example, the transmit shift register 422 shifts data out of the transmit shift register 422 starting with the MSB. Also, when the transmit shift register 422 receives data, the transmit shift register 422 shifts data into the transmit shift register 422 starting with the LSB.

In the illustrated example of FIG. 4, the first hardware control circuit 414 reads data shifted out of the transmit shift register 422. As such, the first hardware control circuit 414 can access a header and a corresponding payload. In the example of FIG. 4, based on the CSN signal being asserted (e.g., being pulled low by the controller device 202), the first hardware control circuit 414 communicates the header and the payload to the controller device 202 via the POCI pin of the communication bus 206. After the CSN signal is de-asserted for the peripheral device 204, the first hardware control circuit 414 signals the event trigger circuit 418 to transmit a chip select interrupt to the second programmable processor circuit 216. As such, based on the chip select signal being de-asserted, the event trigger circuit 418 transmits a chip select interrupt to the second programmable processor circuit 216.

In the illustrated example of FIG. 4, based on the chip select interrupt, software executing on the second programmable processor circuit 216 clears the commit flag (e.g., via the interface circuit 402). As such, the second hardware communication circuitry 214 can receive another header from software executing on the second programmable processor circuit 216. As a safety feature, the first hardware control circuit 414 does not permit software executing on the second programmable processor circuit 216 to clear the commit flag while CSN signal is asserted (e.g., low) during active communication.

In the illustrated example of FIG. 4, when the first hardware control circuit 414 receives data (e.g., a header and a payload) from the controller device 202 via the PICO pin of the communication bus 206, the first hardware control circuit 414 loads the data into the receive shift register 424. In the example of FIG. 4, the receive shift register 424 shifts data into and out of the receive shift register 424 based on a clock signal from the clock control circuit 410. For example, when the receive shift register 424 receives data, the receive shift register 424 shifts data into the receive shift register 424 starting with the LSB. Also, the receive shift register 424 shifts data out of the receive shift register 424 starting with the MSB.

In the illustrated example of FIG. 4, the receive queue 408 implements a FIFO queue as described above. In the example of FIG. 4, the receive queue 408 operates based on a clock signal from at least one of the second programmable processor circuit 216 or the clock control circuit 410. Also, the receive queue 408 transfers data (e.g., a header, a payload, etc.) to the interface circuit 402. When the interface circuit 402 receives data from the receive queue 408, the interface circuit 402 determines an address associated with the data. For example, if the data is addressed to the second programmable processor circuit 216, the interface circuit 402 forwards the data to the second programmable processor circuit 216. If the data is addressed to a register in the MMR bank 404, the interface circuit 402 cause storage of the data in the register. As described above, the MMR bank 404 includes one or more registers to store configuration data for the second hardware communication circuitry 214.

Figure 5:
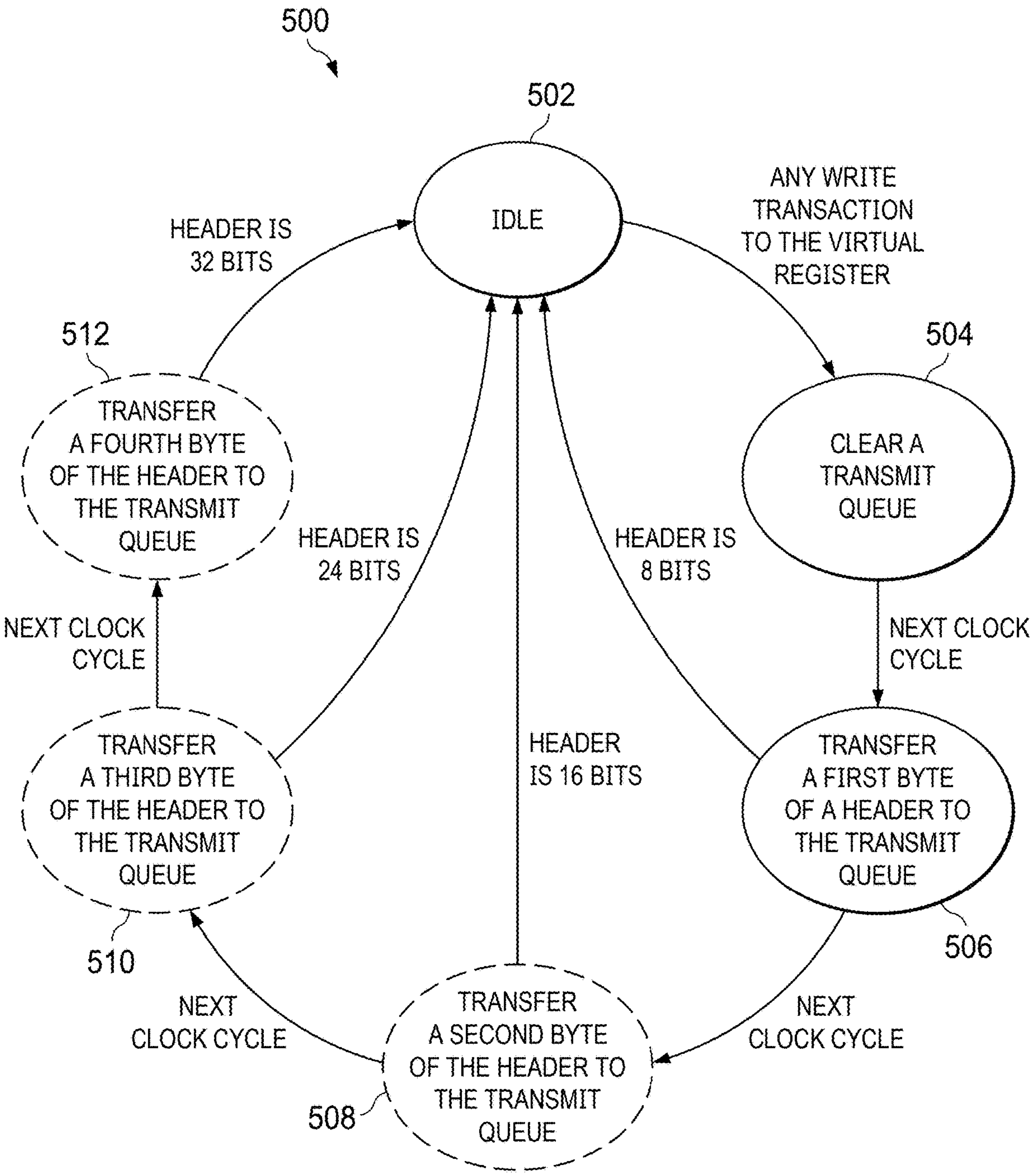
FIG. 5 is a state diagram representative of example operations that may be performed by the first hardware control circuit of FIG. 4.

FIG. 5 is a state diagram representative of example operations 500 that may be performed by the first hardware control circuit 414 of FIG. 4. For example, the state diagram of FIG. 5 includes a first example state 502 in which the first hardware control circuit 414 is idle. In the example of FIG. 5, the first hardware control circuit 414 transitions from the first state 502 to a second example state 504 based on (e.g., in response to) any write transaction to the virtual register maintained by the MMR bank 404. In the second state 504, the first hardware control circuit 414 clears the transmit queue 406.

In the illustrated example of FIG. 5, the first hardware control circuit 414 transitions from the second state 504 to a third example state 506 based on (e.g., in response to) the next clock cycle (e.g., received from the clock control circuit 410). In the third state 506, the first hardware control circuit 414 causes the interface circuit 402 to transfer a first byte of a header (e.g., 0xCB) to the transmit queue 406 (e.g., from the second on-chip interconnect bus 218). As described above, examples described herein support headers of up to 32 bits in 8-bit increments (e.g., 8-bits, 16-bits, 24-bits, and 32-bits).

In the illustrated example of FIG. 5, if the header is one byte (e.g., 8 bits) in length, then the first hardware control circuit 414 transitions from the third state 506 to the first state 502. If the header is greater than one byte (e.g., more than 8 bits) in length, then the first hardware control circuit 414 transitions from the third state 506 to a fourth example state 508 based on (e.g., in response to) the next clock cycle (e.g., received from the clock control circuit 410). In the fourth state 508, the first hardware control circuit 414 causes the interface circuit 402 to transfer a second byte of the header (e.g., 0xAB) to the transmit queue 406 (e.g., from the second on-chip interconnect bus 218).

In the illustrated example of FIG. 5, if the header is two bytes (e.g., 16 bits) in length, then the first hardware control circuit 414 transitions from the fourth state 508 to the first state 502. If the header is greater than two bytes (e.g., more than 16 bits) in length, then the first hardware control circuit 414 transitions from the fourth state 508 to a fifth example state 510 based on (e.g., in response to) the next clock cycle (e.g., received from the clock control circuit 410). In the fifth state 510, the first hardware control circuit 414 causes the interface circuit 402 to transfer a third byte of the header (e.g., 0xCD) to the transmit queue 406 (e.g., from the second on-chip interconnect bus 218).

In the illustrated example of FIG. 5, if the header is three bytes (e.g., 24 bits) in length, then the first hardware control circuit 414 transitions from the fifth state 510 to the first state 502. If the header is greater than three bytes (e.g., more than 24 bits) in length, then the first hardware control circuit 414 transitions from the fifth state 510 to a sixth example state 512 based on (e.g., in response to) the next clock cycle (e.g., received from the clock control circuit 410). In the sixth state 512, the first hardware control circuit 414 causes the interface circuit 402 to transfer a fourth byte of the header (e.g., 0xEF) to the transmit queue 406 (e.g., from the second on-chip interconnect bus 218). After the sixth state 512, the first hardware control circuit 414 transitions from the sixth state 512 to the first state 502.

As illustrated in FIG. 5, the first hardware control circuit 414 causes the header to be transferred from the second on-chip interconnect bus 218 to the transmit queue 406. As such, the first hardware control circuit 414 can read the header from the transmit queue 406 (e.g., via the transmit shift register 422) and transmit the header on the POCI pin of the communication bus 206. In this manner, the transmit queue 406 is coupled to the POCI pin of the communication bus 206 (e.g., via the transmit shift register 422 and the first hardware control circuit 414).

Figure 6:
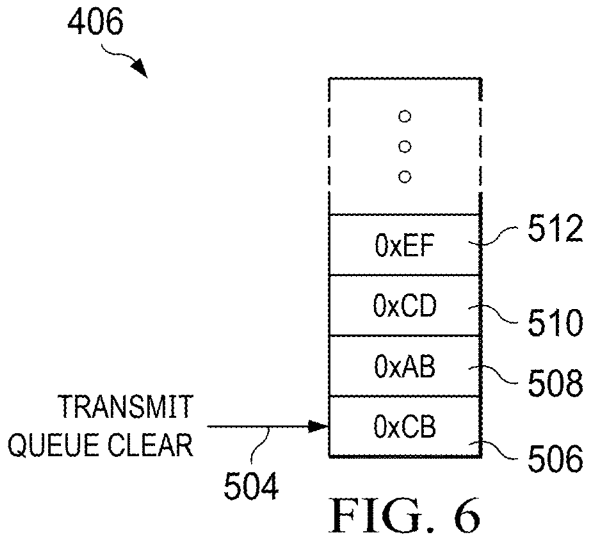
FIG. 6 is a block diagram illustrating example population of the transmit queue of FIG. 4 with respect to the operations of FIG. 5.

FIG. 6 is a block diagram illustrating example population of the transmit queue 406 of FIG. 4 with respect to the operations 500 of FIG. 5. For example, as described above, in the second state 504, the first hardware control circuit 414 clears the transmit queue 406. Also, in the third state 506, the first hardware control circuit 414 causes the interface circuit 402 to transfer a first byte of a header (e.g., 0xCB) to the transmit queue 406. In the fourth state 508, the first hardware control circuit 414 causes the interface circuit 402 to transfer a second byte of the header (e.g., 0xAB) to the transmit queue 406. Also, in the fifth state 510, the first hardware control circuit 414 causes the interface circuit 402 to transfer a third byte of the header (e.g., 0xCD) to the transmit queue 406. In the sixth state 512, the first hardware control circuit 414 causes the interface circuit 402 to transfer a fourth byte of the header (e.g., 0xEF) to the transmit queue 406.

Figure 7:
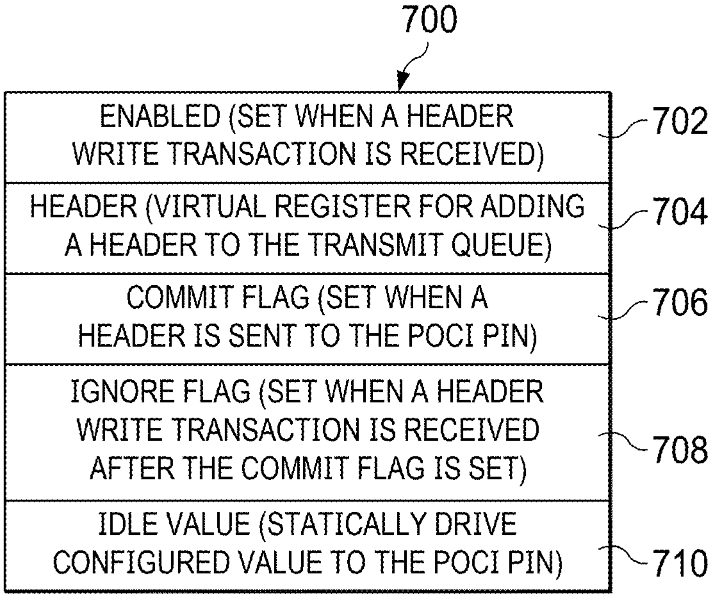
FIG. 7 is a block diagram illustrating example memory mapped registers for an example header.

FIG. 7 is a block diagram illustrating example memory mapped registers (MMRs) 700 for an example header. In the example of FIG. 7, the MMRs 700 include a first example register 702 to store an enabled flag for the header. For example, the first register 702 is implemented by one or more flip-flops (e.g., physical storage). As described above, the enabled flag is set when a header write transaction is received. The MMRs 700 of FIG. 7 also include a second example register 704. In the example of FIG. 7, the second register 704 is a virtual register reserved for the header. For example, the MMRs 700 do not include any flip-flops to store a header addressed to the second register 704 (e.g., there is no physical storage to hold data addressed to the virtual register). In the example of FIG. 7, the second register 704 supports headers of up to 32 bits in 8-bit increments (e.g., 8-bits, 16-bits, 24-bits, and 32-bits). In the example of FIG. 7, the MMRs 700 include a third example register 706 to store a commit flag for the header. For example, the third register 706 is implemented by one or more flip-flops (e.g., physical storage). As described above, the commit flag indicates whether the header is committed. For example, when a header is committed, the header cannot be overwritten.

In the illustrated example of FIG. 7, the MMRs 700 also include a fourth example register 708 to store an ignore flag for the header. For example, the fourth register 708 is implemented by one or more flip-flops (e.g., physical storage). As described above, the ignore flag indicates whether a header addressed to the second register 704 (e.g., a virtual register) was written to the transmit queue 406. In the example of FIG. 7, the MMRs 700 include a fifth example register 710 to store an idle value. For example, the fifth register 710 is implemented by one or more flip-flops (e.g., physical storage). As described above, the idle value is a configured value that is to be transmitted on the POCI pin in the absence of data sent from software executing on the second programmable processor circuit 216.

Figure 8:
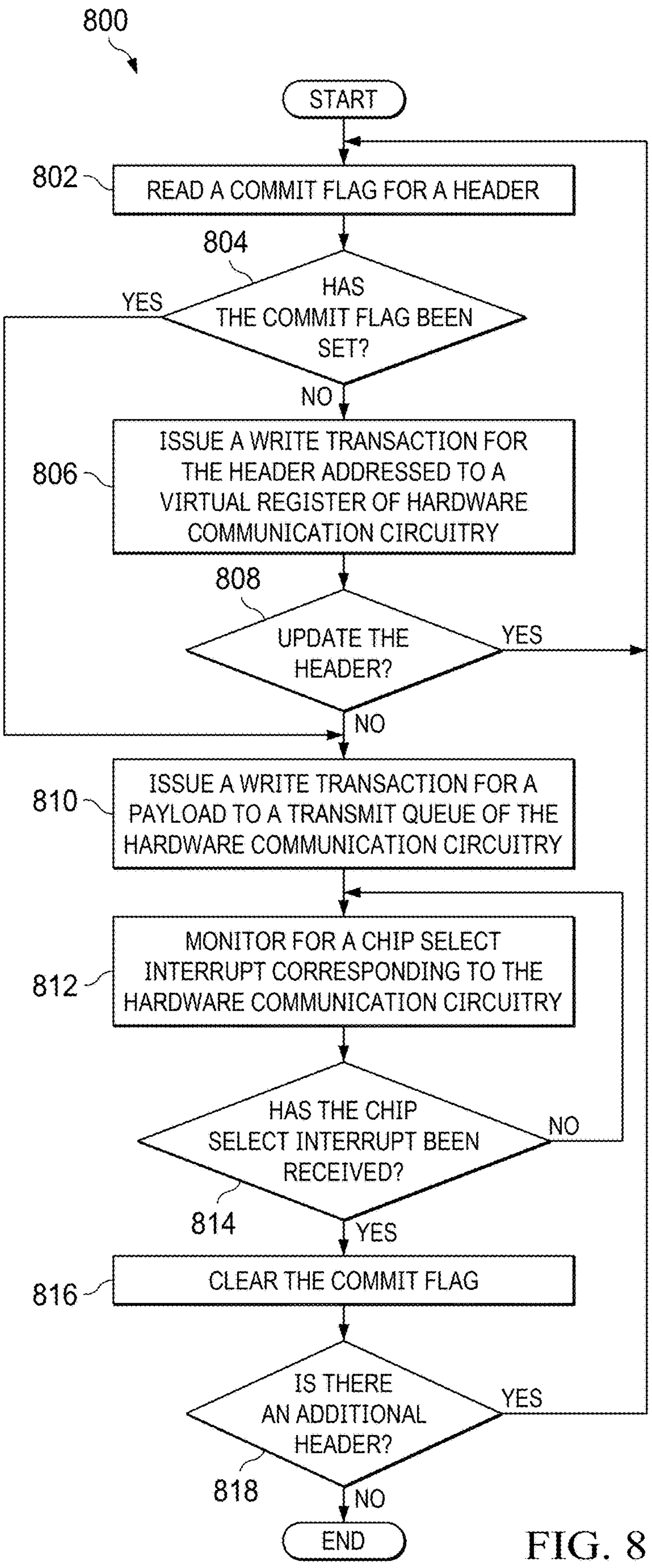
FIG. 8 is a flowchart representative of at least one of example machine-readable instructions or example operations that may be at least one of executed, instantiated, or performed using an example programmable circuitry implementation of the second programmable processor circuit of FIG. 2.

FIG. 8 is a flowchart representative of at least one of example machine-readable instructions or example operations 800 that may be at least one of executed, instantiated, or performed using an example programmable circuitry implementation of the second programmable processor circuit 216 of FIG. 2. At least one of the example machine-readable instructions or the example operations 800 of FIG. 8 begin at block 802, at which the second programmable processor circuit 216 reads a commit flag for a header to be transmitted to a controller device. For example, the second programmable processor circuit 216 reads the commit flag from the MMR bank 404.

In the illustrated example of FIG. 8, at block 804, the second programmable processor circuit 216 determines whether the commit flag has been set. For example, if the commit flag has a value of zero, then the second programmable processor circuit 216 determines that the commit flag is not set. Also, for example, if the commit flag has a value of one, then the second programmable processor circuit 216 determines that the commit flag is set. Based on (e.g., in response to) the second programmable processor circuit 216 determining that the commit flag is set (block 804: YES), at least one of the machine-readable instructions or the operations 800 proceed to block 810. Based on (e.g., in response to) the second programmable processor circuit 216 determining that the commit flag is not set (block 804: NO), at least one of the machine-readable instructions or the operations 800 proceed to block 806.

In the illustrated example of FIG. 8, at block 806, the second programmable processor circuit 216 issues a write transaction for the header where the write transaction is addressed to a virtual register of hardware communication circuitry. For example, the second programmable processor circuit 216 issues a write transaction for the header where the write transaction is addressed to a virtual register of the second hardware communication circuitry 214. At block 808, the second programmable processor circuit 216 determines whether to update the header. For example, the second programmable processor circuit 216 can refresh the header to provide an updated header. Also or alternatively, the second programmable processor circuit 216 can refresh the header to provide the latest value for one or more fields of the header.

In the illustrated example of FIG. 8, based on (e.g., in response to) the second programmable processor circuit 216 determining to update the header (block 808: YES), at least one of the machine-readable instructions or the operations 800 return to block 802. Based on (e.g., in response to) the second programmable processor circuit 216 determining not to update the header (block 808: NO), at least one of the machine-readable instructions or the operations 800 proceed to block 810. At block 810, the second programmable processor circuit 216 issues a write transaction for (e.g., is configured to write, writes, etc.) a payload to a transmit queue of the hardware communication circuitry. For example, the second programmable processor circuit 216 issues a write transaction for a payload where the write transaction is addressed to the transmit queue 406 of the second hardware communication circuitry 214.

In the illustrated example of FIG. 8, at block 812, the second programmable processor circuit 216 monitors for a chip select interrupt corresponding to the hardware communication circuitry. For example, the second programmable processor circuit 216 monitors for an interrupt from the event trigger circuit 418. At block 814, the second programmable processor circuit 216 determines whether the chip select interrupt has been received. The second programmable processor circuit 216 can check for the chip select interrupt in block 814 by monitoring the event trigger circuit 418 at the second I/O terminal. As described above, the event trigger circuit 418 sends the chip select interrupt to the second programmable processor circuit 216 based on the CSN signal transitioning to inactive. Based on (e.g., in response to) the second programmable processor circuit 216 determining that the chip select interrupt has not been received (block 814: NO), at least one of the machine-readable instructions or the operations 800 return to block 812. Based on (e.g., in response to) the second programmable processor circuit 216 determining that the chip select interrupt has been received (block 814: YES), at least one of the machine-readable instructions or the operations 800 proceed to block 816.

In the illustrated example of FIG. 8, at block 816, the second programmable processor circuit 216 clears the commit flag. For example, the second programmable processor circuit 216 clears the commit flag by setting the commit flag to zero. The second programmable processor circuit 216 can clear the commit flag in response to determining, in block 814, that the CSN signal has transitioned to inactive based on receipt of the chip select interrupt. At block 818, the second programmable processor circuit 216 determines whether there is an additional header to be communicated to the controller device. Based on (e.g., in response to) the second programmable processor circuit 216 determining that there is an additional header (block 818: YES), at least one of the machine-readable instructions or the operations 800 return to block 802. Based on (e.g., in response to) the second programmable processor circuit 216 determining that there is not an additional header (block 818: NO), at least one of the machine-readable instructions or the operations 800 terminate.

Figure 9A:
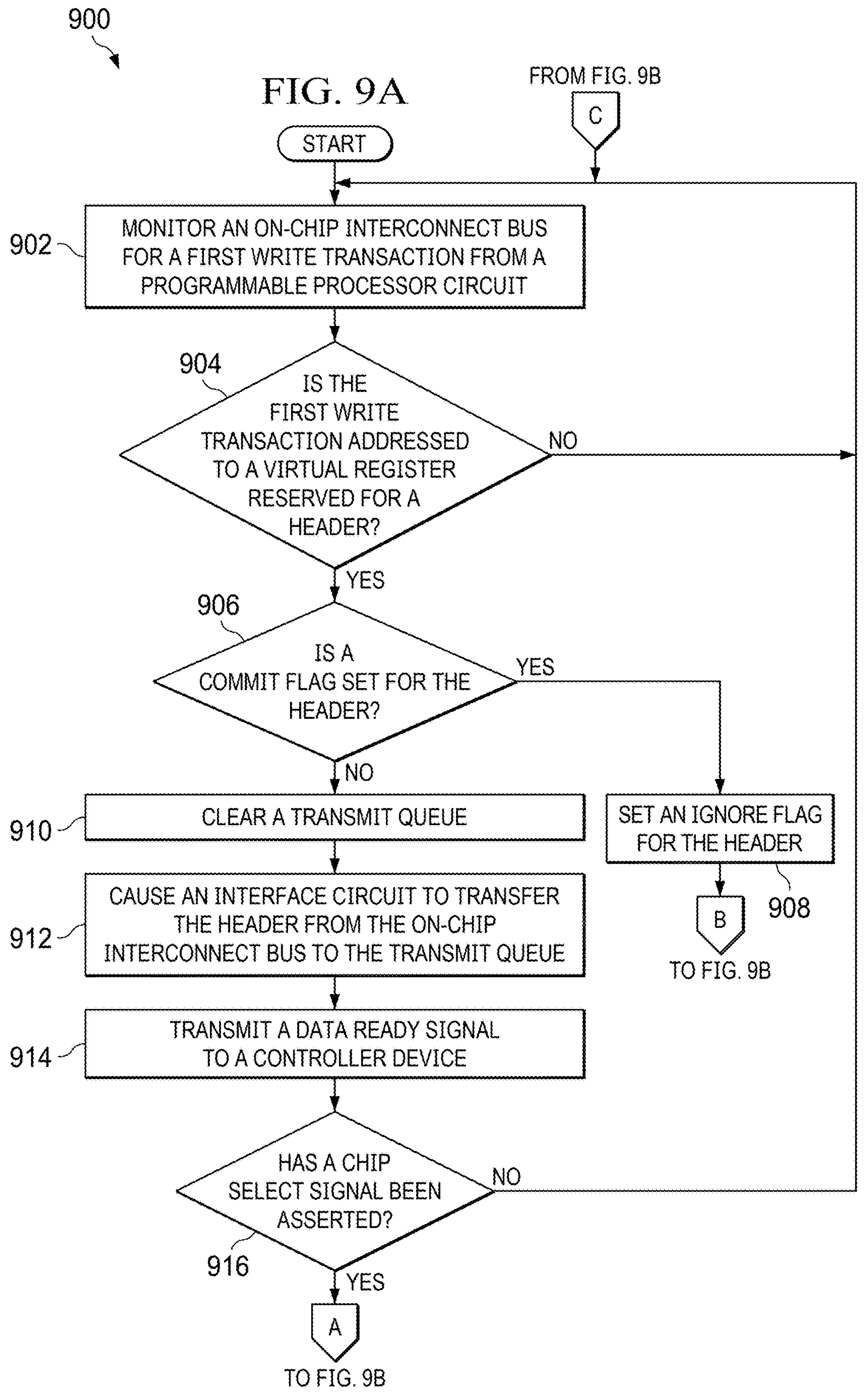
FIG. 9A and FIG. 9B (collectively "FIG. 9") is a flowchart representative of at least one of example machine-readable instructions or example operations that may be at least one of executed, instantiated, or performed using an example programmable circuitry implementation of the second hardware communication circuitry of FIG. 2.
Figure 9B:
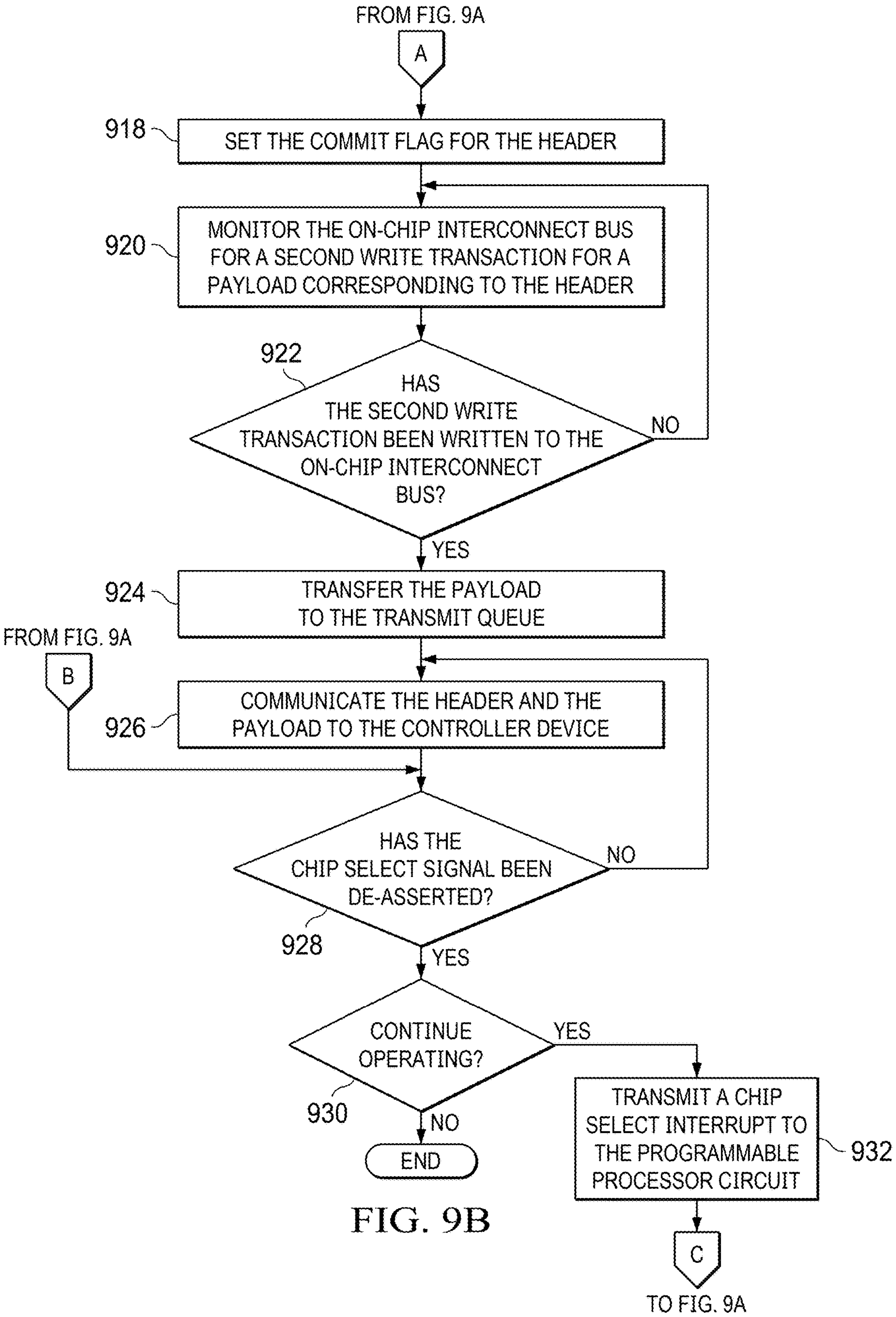

FIG. 9 is a flowchart representative of at least one of example machine-readable instructions or example operations 900 that may be at least one of executed, instantiated, or performed using an example programmable circuitry implementation of the second hardware communication circuitry 214 of FIG. 2. At least one of the example machine-readable instructions or the example operations 900 of FIG. 9 begin at block 902, at which the interface circuit 402 monitors an on-chip interconnect bus for a first write transaction from a programmable processor circuit. For example, the interface circuit 402 monitors the second on-chip interconnect bus 218 for a first write transaction from the second programmable processor circuit 216.

In the illustrated example of FIG. 9, at block 904, based on (e.g., in response to) detecting a first write transaction, the interface circuit 402 determines whether the first write transaction is addressed to a virtual register reserved for a header. For example, the interface circuit 402 determines whether the first write transaction is addressed to the virtual register maintained by the MMR bank 404. Based on (e.g., in response to) the interface circuit 402 determining that the first write transaction is not addressed to the virtual register reserved for the header (block 904: NO), at least one of the machine-readable instructions or the operations 900 return to block 902. Based on (e.g., in response to) the interface circuit 402 determining that the first write transaction is addressed to the virtual register reserved for the header (block 904: YES), at least one of the machine-readable instructions or the operations 900 proceed to block 906.

In the illustrated example of FIG. 9, at block 906, the first hardware control circuit 414 determines whether a commit flag is set for the header. For example, the first hardware control circuit 414 checks the commit flag in the MMR bank 404. Based on (e.g., in response to) the first hardware control circuit 414 determining that the commit flag is set for the header (block 906: YES), at least one of the machine-readable instructions or the operations 900 proceed to block 908. At block 908, the first hardware control circuit 414 sets an ignore flag for the header after determining that the commit flag is set for the header. For example, the first hardware control circuit 414 sets the ignore flag in the MMR bank 404.

Based on (e.g., in response to) the first hardware control circuit 414 determining that the commit flag is not set for the header (block 906: NO), at least one of the machine-readable instructions or the operations 900 proceed to block 910. At block 910, the first hardware control circuit 414 clears a transmit queue. For example, the first hardware control circuit 414 clears the transmit queue 406. At block 912, the first hardware control circuit 414 causes an interface circuit to transfer the header from the on-chip interconnect bus to the transmit queue. For example, the first hardware control circuit 414 causes the interface circuit 402 to transfer the header from the second on-chip interconnect bus 218 to the transmit queue 406.

In the illustrated example of FIG. 9, at block 914, the first hardware control circuit 414 transmits a data ready signal to a controller device. For example, in a four-pin implementation of the communication bus 206, the first hardware control circuit 414 transmits the data ready signal to the controller device via the POCI pin. Also or alternatively, in a five-pin implementation of the communication bus 206, the first hardware control circuit 414 transmits the data ready signal to the controller device via the INT pin. At block 916, the first hardware control circuit 414 determines whether a chip select signal has been asserted.

In the illustrated example of FIG. 9, based on (e.g., in response to) the first hardware control circuit 414 determining that the chip select signal has not been asserted (block 916: NO), at least one of the machine-readable instructions or the operations 900 return to block 902. Based on (e.g., in response to) the first hardware control circuit 414 determining that the chip select signal has been asserted (block 916: YES), at least one of the machine-readable instructions or the operations 900 proceed to block 918. At block 918, based on (e.g., in response to) detecting that a signal on the CSN pin has been asserted, the first hardware control circuit 414 sets the commit flag for the header. For example, the first hardware control circuit 414 sets the commit flag to one.

In the illustrated example of FIG. 9, at block 920, the interface circuit 402 monitors the on-chip interconnect bus for a second write transaction for a payload corresponding to the header. For example, the interface circuit 402 monitors the second on-chip interconnect bus 218. At block 922, the interface circuit 402 determines whether the second write transaction has been written to the on-chip interconnect bus. Based on (e.g., in response to) the interface circuit 402 determining that the second write transaction has not been written to the on-chip interconnect bus (block 922: NO), at least one of the machine-readable instructions or the operations 900 return to block 920. Based on (e.g., in response to) the interface circuit 402 determining that the second write transaction has been written to the on-chip interconnect bus (block 922: YES), at least one of the machine-readable instructions or the operations 900 proceed to block 924.

In the illustrated example of FIG. 9, at block 924, the interface circuit 402 transfers the payload to the transmit queue. For example, the interface circuit 402 transfers the payload to the transmit queue 406. At block 926, the first hardware control circuit 414 communicates the header and the payload to the controller device. For example, the first hardware control circuit 414 communicates the header and the payload to the controller device via the POCI pin. At block 928, the first hardware control circuit 414 determines whether the chip select signal has been de-asserted. Based on (e.g., in response to) the first hardware control circuit 414 determining that the chip select signal has not been de-asserted (block 928: NO), at least one of the machine-readable instructions or the operations 900 return to block 926.

Based on (e.g., in response to) the first hardware control circuit 414 determining that the chip select signal has been de-asserted (block 928: YES), at least one of the machine-readable instructions or the operations 900 proceed to block 930. At block 930, the first hardware control circuit 414 determines whether to continue operating. For example, the first hardware control circuit 414 determines to continue operating while the peripheral device 204 is powered. Based on (e.g., in response to) the first hardware control circuit 414 determining to continue operating (block 930: YES), at least one of the machine-readable instructions or the operations 900 proceed to block 932. At block 932, the event trigger circuit 418 transmits a chip select interrupt to the programmable processor circuit (e.g., the second programmable processor circuit 216). In some examples, after block 932, software executing on the peripheral device 204 clears the commit flag for the header based on (e.g., in response to) the chip select interrupt. Based on (e.g., in response to) the first hardware control circuit 414 determining not to continue operating (block 930: NO), at least one of the machine-readable instructions or the operations 900 terminate.

Figure 10:
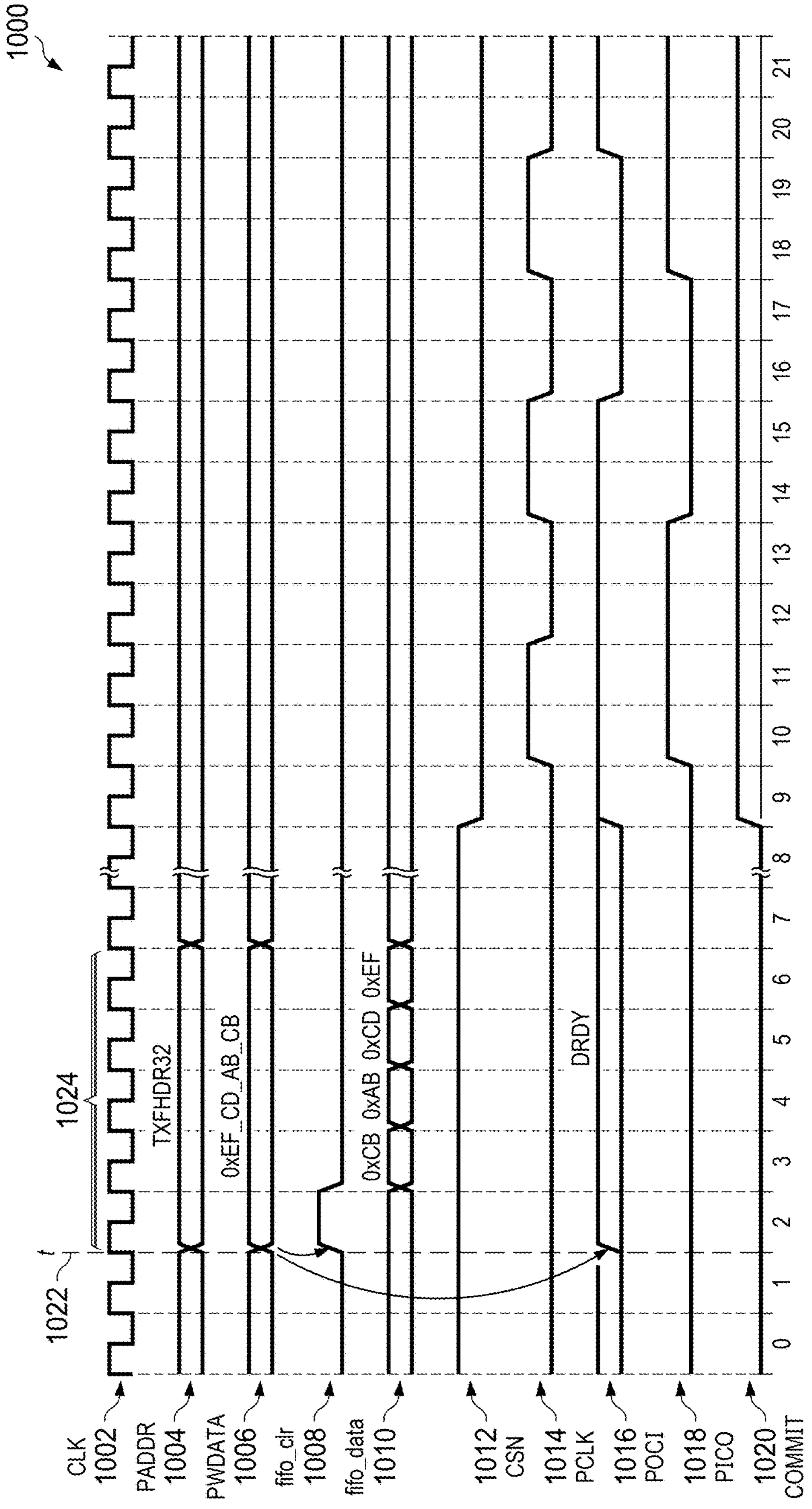
FIG. 10 is a first timing diagram illustrating example communication between a controller device and a peripheral device as described herein.

FIG. 10 is a first timing diagram 1000 illustrating example communication between a controller device and a peripheral device as described herein. For example, the first timing diagram 1000 illustrates example communication between the controller device 202 and the peripheral device 204 of FIG. 2 for a four-pin implementation of the communication bus 206. In the example of FIG. 10, the first timing diagram 1000 includes a first example plot 1002 representative of a clock signal for operation of the second on-chip interconnect bus 218 between the second hardware communication circuitry 214 and the second programmable processor circuit 216 of the peripheral device 204.

In the illustrated example of FIG. 10, the first timing diagram 1000 also includes a second example plot 1004 representative of an address of a write transaction from the second programmable processor circuit 216 and a third example plot 1006 representative of a header included in the write transaction. In the example of FIG. 10, the first timing diagram 1000 includes a fourth example plot 1008 representative of a signal between the first hardware control circuit 414 and the transmit queue 406 of the second hardware communication circuitry 214. The first timing diagram 1000 of FIG. 10 also includes a fifth example plot 1010 representative data stored in the transmit queue 406.

In the illustrated example of FIG. 10, the first timing diagram 1000 includes a sixth example plot 1012 representative of a CSN signal on the CSN pin of the communication bus 206 and a seventh example plot 1014 representative of a PCLK signal on the PCLK pin of the communication bus 206. In the example of FIG. 10, the first timing diagram 1000 also includes an eighth example plot 1016 representative of a POCI signal on the POCI pin of the communication bus 206 and a ninth example plot 1018 representative of a PICO signal on the PICO pin of the communication bus 206. The first timing diagram 1000 of FIG. 10 also includes a tenth example plot 1020 representative of a value of the commit flag stored in the MMR bank 404 of the second hardware communication circuitry 214.

In the illustrated example of FIG. 10, at an example time 1022 (e.g., 1), the second programmable processor circuit 216 issues a write transaction addressed to the virtual register maintained by the MMR bank 404. In the example of FIG. 10, the MMR bank 404 notifies the first hardware control circuit 414 of the write transaction. Based on the write transaction addressed to the virtual register, the first hardware control circuit 414 clears the transmit queue 406 and causes the interface circuit 402 to transfer the header from the second on-chip interconnect bus 218 to the transmit queue 406. As illustrated in FIG. 10, an example period 1024 between the issuance of the write transaction (e.g., the time 1022) and the header being fully written to the transmit queue 406 consumes five clock cycles of the clock signal for operation of the second on-chip interconnect bus 218. For example, two clock cycles are consumed to issue the write transaction to the virtual register and three clock cycles are consumed to transfer the header from the second on-chip interconnect bus 218 to the transmit queue 406.

In the illustrated example of FIG. 10, the first hardware control circuit 414 also drives a data ready signal on the POCI pin based on the write transaction addressed to the virtual register. As described above, under the SPI protocol, the POCI pin would normally be tri-stated (e.g., in a high impedance state) when the CSN signal is not asserted for the peripheral device 204. For example, the SPI protocol dictates that the POCI pin is to be tri-stated while the CSN pin is not asserted to avoid contention multiple peripheral devices in communication with a controller device. In some examples (e.g., when a controller device is in communication with one peripheral device), a peripheral device can utilize the POCI pin to signal the availability of data while the CSN pin is not asserted. Advantageously, by utilizing the POCI pin to transmit the data ready signal to the controller device 202, examples described herein signal the availability of data with a reduced footprint. Also, based on detecting the data ready signal on the POCI pin, the first hardware communication circuitry 208 of the controller device 202 asserts the CSN signal (e.g., pulls the CSN signal low) to initiate communication with the peripheral device 204.

In the illustrated example of FIG. 10, based on the assertion of the CSN signal (e.g., based on the CSN high-to-low transition), the first hardware control circuit 414 transmits the first bit (e.g., bit-0) of the header on the POCI pin to start communicating the header to the controller device 202. Also, based on the assertion of the CSN signal, the first hardware control circuit 414 sets the commit flag to one to signal that the CSN signal has been asserted. As such, if the second programmable processor circuit 216 attempts to refresh the header stored in the transmit queue 406 with a new header, the first hardware control circuit 414 will ignore the new header if the commit flag is set.

Figure 11:
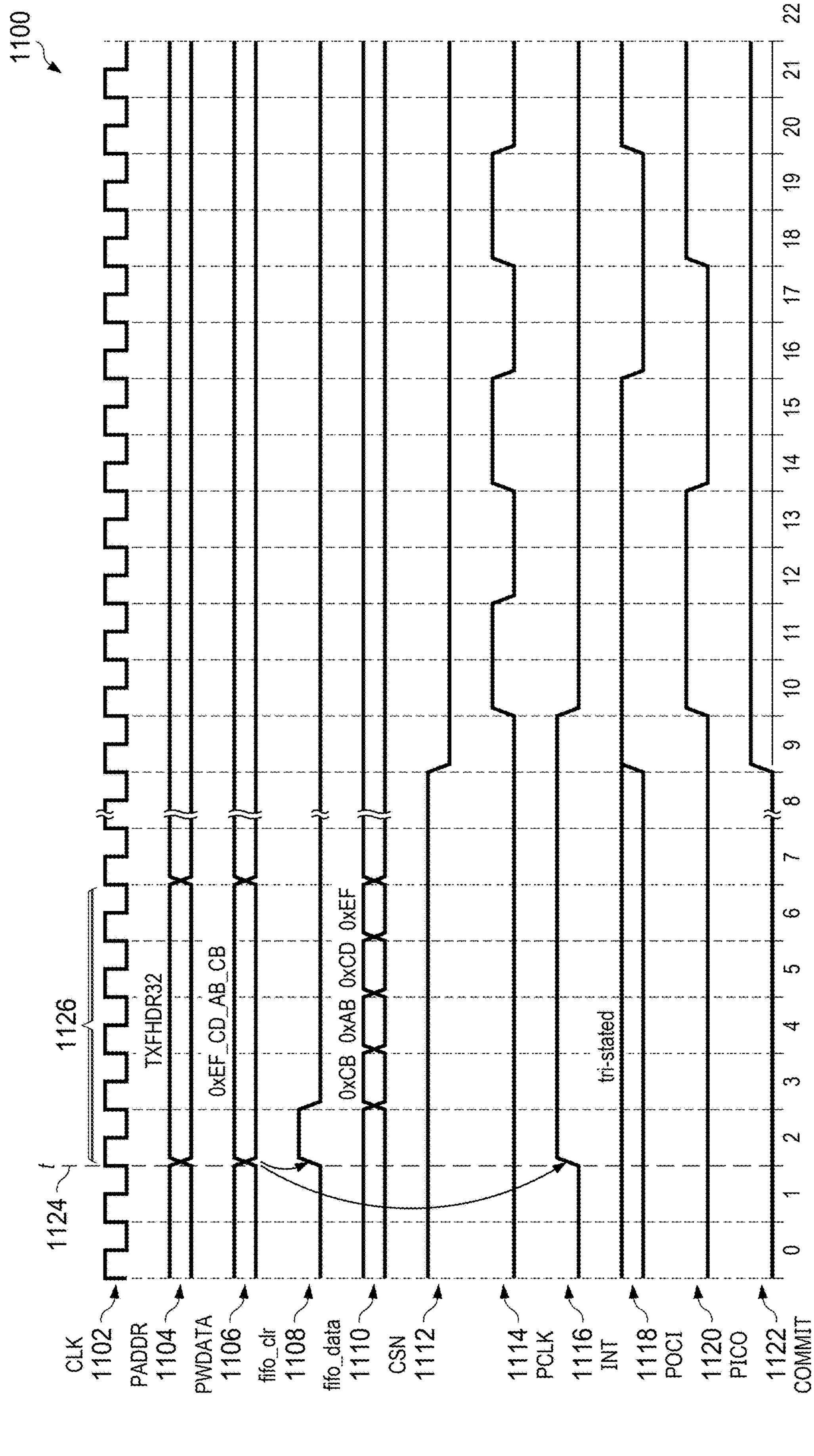
FIG. 11 is a second timing diagram illustrating example communication between a controller device and a peripheral device as described herein.

FIG. 11 is a second timing diagram 1100 illustrating example communication between a controller device and a peripheral device as described herein. For example, the second timing diagram 1100 illustrates example communication between the controller device 202 and the peripheral device 204 of FIG. 2 for a five-pin implementation of the communication bus 206. In the example of FIG. 11, the second timing diagram 1100 includes a first example plot 1102 representative of a clock signal for operation of the second on-chip interconnect bus 218 between the second hardware communication circuitry 214 and the second programmable processor circuit 216 of the peripheral device 204.

In the illustrated example of FIG. 11, the second timing diagram 1100 also includes a second example plot 1104 representative of an address of a write transaction from the second programmable processor circuit 216 and a third example plot 1106 representative of a header included in the write transaction. In the example of FIG. 11, the second timing diagram 1100 includes a fourth example plot 1108 representative of a signal between the first hardware control circuit 414 and the transmit queue 406 of the second hardware communication circuitry 214. The second timing diagram 1100 of FIG. 11 also includes a fifth example plot 1110 representative data stored in the transmit queue 406.

In the illustrated example of FIG. 11, the second timing diagram 1100 includes a sixth example plot 1112 representative of a CSN signal on the CSN pin of the communication bus 206 and a seventh example plot 1114 representative of a PCLK signal on the PCLK pin of the communication bus 206. In the example of FIG. 11, the second timing diagram 1100 also includes an eighth example plot 1116 representative of an INT signal on the INT pin of the communication bus 206 and a ninth example plot 1118 representative of a POCI signal on the POCI pin of the communication bus 206. The second timing diagram 1100 of FIG. 11 also includes a tenth example plot 1120 representative of a PICO signal on the PICO pin of the communication bus 206 and an eleventh example plot 1122 representative of a value of the commit flag stored in the MMR bank 404 of the second hardware communication circuitry 214.

In the illustrated example of FIG. 11, at an example time 1124 (e.g., 1), the second programmable processor circuit 216 issues a write transaction addressed to the virtual register maintained by the MMR bank 404. In the example of FIG. 11, the MMR bank 404 notifies the first hardware control circuit 414 of the write transaction. Based on the write transaction addressed to the virtual register, the first hardware control circuit 414 clears the transmit queue 406 and causes the interface circuit 402 to transfer the header from the second on-chip interconnect bus 218 to the transmit queue 406. As illustrated in FIG. 11, an example period 1126 between the issuance of the write transaction (e.g., the time 1124) and the header being fully written to the transmit queue 406 consumes five clock cycles of the clock signal for operation of the second on-chip interconnect bus 218. For example, two clock cycles are consumed to issue the write transaction to the virtual register and three clock cycles are consumed to transfer the header from the second on-chip interconnect bus 218 to the transmit queue 406.

In the illustrated example of FIG. 11, the first hardware control circuit 414 also drives a data ready signal on the INT pin based on the write transaction addressed to the virtual register. In the example of FIG. 11, the POCI pin is tri-stated (e.g., in a high impedance state) when the CSN signal is not asserted for the peripheral device 204. Advantageously, the INT pin is controlled by the first hardware control circuit 414 and control of the INT pin does not consume processing bandwidth of the second programmable processor circuit 216 (e.g., unlike the GPIO pin-based approach described above). Also, based on detecting the data ready signal on the INT pin, the first hardware communication circuitry 208 of the controller device 202 asserts the CSN signal (e.g., pulls the CSN signal low) to initiate communication with the peripheral device 204.

In the illustrated example of FIG. 11, based on the assertion of the CSN signal (e.g., based on the CSN high-to-low transition), the first hardware control circuit 414 transmits the first bit (e.g., bit-0) of the header on the POCI pin to start communicating the header to the controller device 202. Also, based on the assertion of the CSN signal, the first hardware control circuit 414 sets the commit flag to one to signal that the CSN signal has been asserted. As such, if the second programmable processor circuit 216 attempts to refresh the header stored in the transmit queue 406 with a new header, the first hardware control circuit 414 will ignore the new header. In the example of FIG. 11, the first hardware control circuit 414 de-asserts the INT signal at the first edge of the PCLK signal (e.g., after the CSN signal is asserted by the controller device 202).

Figure 12:
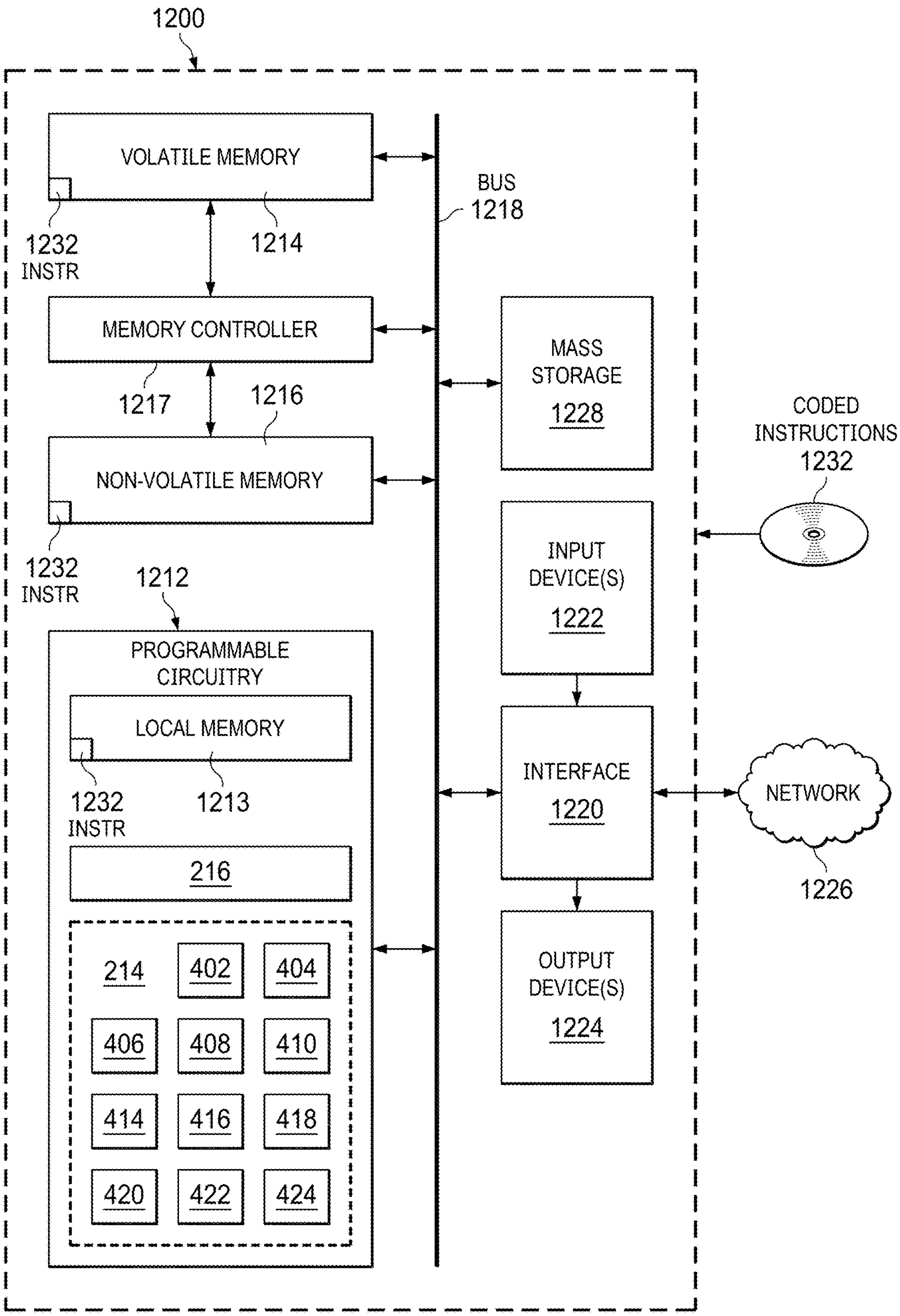
FIG. 12 is a block diagram of an example processing platform including programmable circuitry structured to execute, instantiate, or perform the example machine-readable instructions or perform the example operations of at least one of FIGS. 8 and 9 to implement at least one of the second hardware communication circuitry 214 or the second programmable processor circuit 216 of FIG. 4.

FIG. 12 is a block diagram of an example programmable circuitry platform 1200 structured to one or a combination of execute or instantiate one or more of the example machine-readable instructions or the example operations of at least one of FIGS. 8 and 9 to implement at least one of the second hardware communication circuitry 214 or the second programmable processor circuit 216 of FIG. 4. The programmable circuitry platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing or electronic device.

The programmable circuitry platform 1200 of the illustrated example includes programmable circuitry 1212. The programmable circuitry 1212 of the illustrated example is hardware. For example, the programmable circuitry 1212 can be implemented by one or more integrated circuits, logic circuits, FPGAs, microprocessors, CPUs, GPUs, DSPs, or microcontrollers from any desired family or manufacturer. The programmable circuitry 1212 may be implemented by one or more semiconductor based (e.g., silicon based) devices. In this example, the programmable circuitry 1212 implements the example interface circuit 402, the example MMR bank 404, the example transmit queue 406, the example receive queue 408, the example clock control circuit 410, the first example hardware control circuit 414, the second example hardware control circuit 416, the example event trigger circuit 418, the example DMA interface 420, the example transmit shift register 422, the example receive shift register 424, or, more generally, the second example hardware communication circuitry 214, and the second example programmable processor circuit 216.

The programmable circuitry 1212 of the illustrated example includes a local memory 1213 (e.g., a cache, registers, etc.). The programmable circuitry 1212 of the illustrated example is in communication with main memory 1214, 1216, which includes a volatile memory 1214 and a non-volatile memory 1216, by a bus 1218. The volatile memory 1214 may be implemented by one or more Synchronous Dynamic Random Access Memory (SDRAM), Dynamic Random Access Memory (DRAM), RAMBUS® Dynamic Random Access Memory (RDRAM®), or any other type of RAM device. The non-volatile memory 1216 may be implemented by one or a combination of flash memory or any other desired type of memory device. Access to the main memory 1214, 1216 of the illustrated example is controlled by a memory controller 1217. In some examples, the memory controller 1217 may be implemented by one or more integrated circuits, logic circuits, microcontrollers from any desired family or manufacturer, or any other type of circuitry to manage the flow of data going to and from the main memory 1214, 1216.

The programmable circuitry platform 1200 of the illustrated example also includes interface circuitry 1220. The interface circuitry 1220 may be implemented by hardware in according to any type of interface standard, such as an Ethernet interface, a universal serial bus (USB) interface, a Bluetooth® interface, a near field communication (NFC) interface, a Peripheral Component Interconnect (PCI) interface, or a Peripheral Component Interconnect Express (PCIe) interface.

In the illustrated example, one or more input devices 1222 are connected to the interface circuitry 1220. The input device(s) 1222 permit(s) a user (e.g., a human user, a machine user, etc.) to enter one of or a combination of data or commands into the programmable circuitry 1212. The input device(s) 1222 can be implemented by, for example, one of or a combination of an audio sensor, a microphone, a camera (still or video), a keyboard, a button, a mouse, a touchscreen, a trackpad, a trackball, an isopoint device, or a voice recognition system.

One or more output devices 1224 are also connected to the interface circuitry 1220 of the illustrated example. The output device(s) 1224 can be implemented, for example, by one of or a combination of display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, or speaker. The interface circuitry 1220 of the illustrated example, thus, includes one of or a combination of a graphics driver card, a graphics driver chip, or graphics processor circuitry such as a GPU.

The interface circuitry 1220 of the illustrated example also includes a communication device such as one of or a combination of a transmitter, a receiver, a transceiver, a modem, a residential gateway, a wireless access point, or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1200 of the illustrated example also includes one or more mass storage discs or devices 1228 to store one or more of firmware, software, or data. Examples of such mass storage discs or devices 1228 include one or more magnetic storage devices (e.g., floppy disk, drives, HDDs, etc.), optical storage devices (e.g., Blu-ray disks, CDs, DVDs, etc.), RAID systems, or solid-state storage discs or devices such as flash memory devices and SSDs.

The machine-readable instructions 1232, which may be implemented by the machine-readable instructions of FIGS. 8 and 9, may be stored in one of or a combination of the mass storage device 1228, in the volatile memory 1214, in the non-volatile memory 1216, or on at least one non-transitory computer-readable storage medium such as a CD or DVD which may be removable.

Figure 13:
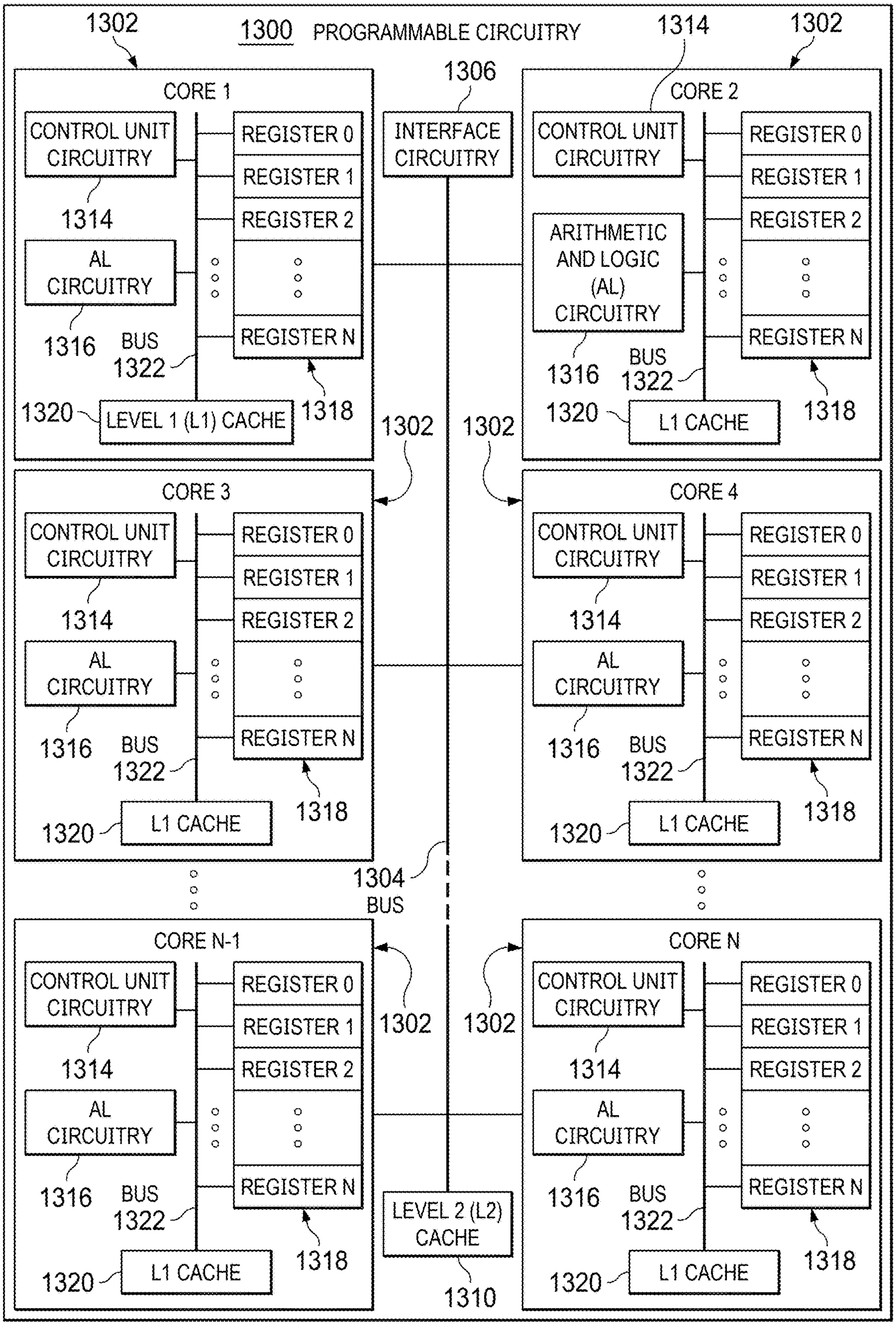
FIG. 13 is a block diagram of an example implementation of the programmable circuitry of FIG. 12.

FIG. 13 is a block diagram of an example implementation of the programmable circuitry 1212 of FIG. 12. In this example, the programmable circuitry 1212 of FIG. 12 is implemented by a microprocessor 1300. For example, the microprocessor 1300 may be a general-purpose microprocessor (e.g., general-purpose microprocessor circuitry). The microprocessor 1300 executes some or all of the machine-readable instructions of the flowcharts of FIGS. 8 and 9 to effectively instantiate the circuitry of FIG. 4 as logic circuits to perform operations corresponding to those machine-readable instructions. In some such examples, the circuitry of FIG. 4 is instantiated by the hardware circuits of the microprocessor 1300 in combination with the machine-readable instructions. For example, the microprocessor 1300 may be implemented by multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine-readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine-readable instructions or operations represented by the flowcharts of FIGS. 8 and 9.

The cores 1302 may communicate by a first example bus 1304. In some examples, the first bus 1304 may be implemented by a communication bus to effectuate communication associated with one(s) of the cores 1302. For example, the first bus 1304 may be implemented by at least one of an Inter-Integrated Circuit (I2C) bus, a Serial Peripheral Interface (SPI) bus, a PCI bus, or a PCIe bus. Also or alternatively, the first bus 1304 may be implemented by any other type of computing or electrical bus. The cores 1302 may obtain data, instructions, and signals from one or more external devices by example interface circuitry 1306. The cores 1302 may output data, instructions, and signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2 cache)) for high-speed access to data and instructions. Data and instructions may be transferred (e.g., shared) by one of or a combination of writing to or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Higher levels of memory in the hierarchy tend to exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry 1316 (sometimes referred to as an ALU), a plurality of registers 1318, the local memory 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic or logic operations on the data within the corresponding core 1302. The AL circuitry 1316 of some examples performs integer-based operations. In other examples, the AL circuitry 1316 also performs floating-point operations. In yet other examples, the AL circuitry 1316 may include first AL circuitry that performs integer-based operations and second AL circuitry that performs floating-point operations. In some examples, the AL circuitry 1316 may be referred to as an Arithmetic Logic Unit (ALU).

The registers 1318 are semiconductor-based structures to store data and instructions such as results of one or more of the operations performed by the AL circuitry 1316 of the corresponding core 1302. For example, the registers 1318 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure, such as by being distributed throughout the core 1302 to shorten access time. The second bus 1322 may be implemented by at least one of an I2C bus, a SPI bus, a PCI bus, or a PCIe bus.

Each core 1302 or, more generally, the microprocessor 1300 may include additional or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) or other circuitry may be present. The microprocessor 1300 is a semiconductor device fabricated to include many transistors interconnected to implement the structures described above in one or more integrated circuits (ICs) contained in one or more packages.

The microprocessor 1300 may include or cooperate with one or more accelerators (e.g., acceleration circuitry, hardware accelerators, etc.). In some examples, accelerators are implemented by logic circuitry to perform certain tasks more quickly and efficiently than can be done by a general-purpose processor. Examples of accelerators include ASICs and FPGAs such as those described herein. A GPU, DSP, or other programmable device can also be an accelerator. Accelerators may be on-board the microprocessor 1300, in the same chip package as the microprocessor 1300, or in one or more separate packages from the microprocessor 1300.

Figure 14:
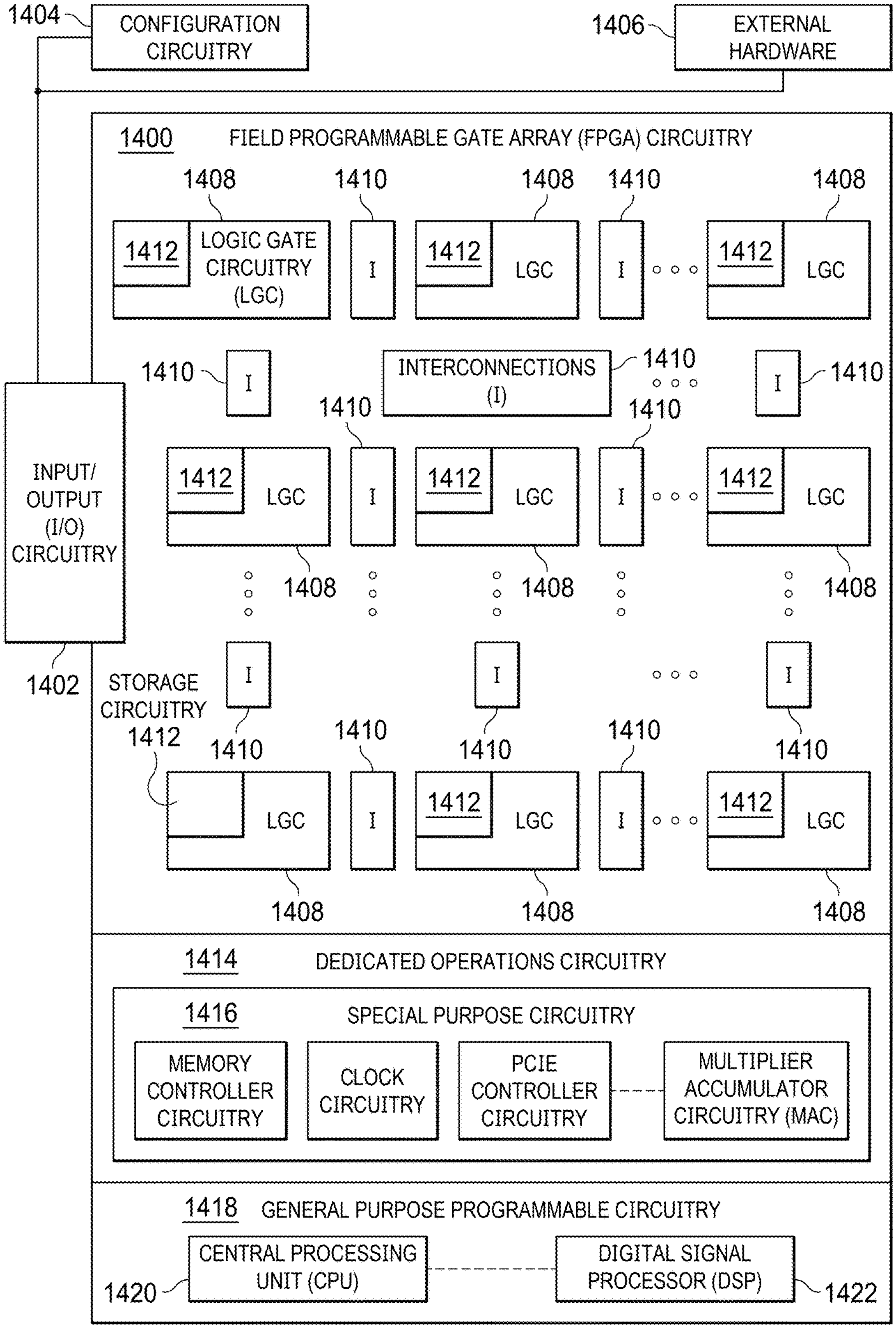
FIG. 14 is a block diagram of another example implementation of the programmable circuitry of FIG. 12.

FIG. 14 is a block diagram of another example implementation of the programmable circuitry 1212 of FIG. 12. In this example, the programmable circuitry 1212 is implemented by FPGA circuitry 1400. For example, the FPGA circuitry 1400 may be implemented by an FPGA. The FPGA circuitry 1400 can be used, for example, to perform operations that could otherwise be performed by the example microprocessor 1300 of FIG. 13 executing corresponding machine-readable instructions. However, once configured, the FPGA circuitry 1400 instantiates the operations and functions corresponding to the machine-readable instructions in hardware and, thus, can often execute the operations/functions faster than they could be performed by a general-purpose microprocessor executing the corresponding software.

More specifically, in contrast to the microprocessor 1300 of FIG. 13 described above (which is a general purpose device that may be programmed to execute some or all of the machine-readable instructions represented by the flowchart(s) of FIGS. 8 and 9 but whose interconnections and logic circuitry are fixed once fabricated), the FPGA circuitry 1400 of the example of FIG. 14 includes interconnections and logic circuitry that may be one of or a combination of configured, structured, programmed, and interconnected in different ways after fabrication to instantiate, for example, some or all of the operations/functions corresponding to the machine-readable instructions represented by the flowchart(s) of FIGS. 8 and 9. In particular, the FPGA circuitry 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the instructions (e.g., at least one of the software or the firmware) represented by the flowchart(s) of FIGS. 8 and 9. As such, the FPGA circuitry 1400 may be at least one of configured or structured to effectively instantiate some or all of the operations/functions corresponding to the machine-readable instructions of the flowchart(s) of FIGS. 8 and 9 as dedicated logic circuits to perform the operations/functions corresponding to those software instructions in a dedicated manner analogous to an ASIC. Therefore, the FPGA circuitry 1400 may perform the operations/functions corresponding to the some or all of the machine-readable instructions of FIGS. 8 and 9 faster than the general-purpose microprocessor can execute the same.

In the example of FIG. 14, the FPGA circuitry 1400 is at least one of configured or structured in response to being at least one of programmed or reprogrammed (one or more times) based on a binary file. In some examples, the binary file may be one of or both of compiled or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1400 of FIG. 14 may at least one of access or load the binary file to at least one of configure or structure the FPGA circuitry 1400 of FIG. 14 to perform the one or more operations/functions. For example, the binary file may be implemented by one of or a combination of a bit stream (e.g., one or more computer-readable bits, one or more machine-readable bits, etc.), data (e.g., computer-readable data, machine-readable data, etc.), or machine-readable instructions accessible to the FPGA circuitry 1400 of FIG. 14 to at least one of configure or structure the FPGA circuitry 1400 of FIG. 14, or portion(s) thereof.

In some examples, the binary file is at least one of compiled, generated, transformed, or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is at least one of compiled, generated, or otherwise output from the uniform software platform based on the second instructions. In some examples, the FPGA circuitry 1400 of FIG. 14 may at least one of access or load the binary file to at least one of configure or structure the FPGA circuitry 1400 of FIG. 14 to perform the one or more operations/functions. For example, the binary file may be implemented by one of or a combination of a bit stream (e.g., one or more computer-readable bits, one or more machine-readable bits, etc.), data (e.g., computer-readable data, machine-readable data, etc.), or machine-readable instructions accessible to the FPGA circuitry 1400 of FIG. 14 to at least one of configure or structure the FPGA circuitry 1400 of FIG. 14, or portion(s) thereof.

The FPGA circuitry 1400 of FIG. 14, includes example input/output (I/O) circuitry 1402 to at least one of obtain or output data to/from at least one of example configuration circuitry 1404 or external hardware 1406. For example, the configuration circuitry 1404 may be implemented by interface circuitry that may obtain a binary file, which may be implemented by one or more of a bit stream, data, or machine-readable instructions, to configure the FPGA circuitry 1400, or portion(s) thereof. In some such examples, the configuration circuitry 1404 may obtain the binary file from one of or a combination of a user, a machine (e.g., hardware circuitry (e.g., programmable or dedicated circuitry) that may implement an Artificial Intelligence/Machine Learning (AI/ML) model to generate the binary file, etc.), or any combination(s) thereof). In some examples, the external hardware 1406 may be implemented by external hardware circuitry. For example, the external hardware 1406 may be implemented by the microprocessor 1300 of FIG. 13.

The FPGA circuitry 1400 also includes an array of example logic gate circuitry 1408, a plurality of example configurable interconnections 1410, and example storage circuitry 1412. The logic gate circuitry 1408 and the configurable interconnections 1410 are configurable to instantiate one or more operations/functions that may correspond to one or more of at least some of the machine-readable instructions of FIGS. 8 and 9 or other desired operations. The logic gate circuitry 1408 shown in FIG. 14 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of one of or a combination of the electrical structures or the logic gates to form circuits to perform desired operations/functions. The logic gate circuitry 1408 may include other electrical structures such as look-up tables (LUTs), registers (e.g., flip-flops or latches), multiplexers, etc.

The configurable interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example dedicated operations circuitry 1414. In this example, the dedicated operations circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 or an example DSP 1422. Other general purpose programmable circuitry 1418 may also or alternatively be present such as a GPU, an XPU, etc., that can be programmed to perform other operations.

Although FIGS. 13 and 14 illustrate two example implementations of the programmable circuitry 1212 of FIG. 12, many other approaches are contemplated. For example, FPGA circuitry may include an on-board CPU, such as one or more of the example CPU 1420 of FIG. 13. Therefore, the programmable circuitry 1212 of FIG. 12 may also be implemented by combining at least the example microprocessor 1300 of FIG. 13 and the example FPGA circuitry 1400 of FIG. 14. In some such hybrid examples, at least one of (a) one or more cores 1302 of FIG. 13 may execute a first portion of the machine-readable instructions represented by the flowchart(s) of FIGS. 8 and 9 to perform first operation(s)/function(s), (b) the FPGA circuitry 1400 of FIG. 14 may be at least one of configured or structured to perform second operation(s)/function(s) corresponding to a second portion of the machine-readable instructions represented by the flowcharts of FIGS. 8 and 9, or (c) an ASIC may be at least one of configured or structured to perform third operation(s)/function(s) corresponding to a third portion of the machine-readable instructions represented by the flowcharts of FIGS. 8 and 9.

Some or all of the circuitry of FIG. 4 may, thus, be instantiated at the same or different times. For example, at least one of the same or different portion(s) of the microprocessor 1300 of FIG. 13 may be programmed to execute portion(s) of machine-readable instructions at one or more of the same or different times. In some examples, at least one of the same or different portion(s) of the FPGA circuitry 1400 of FIG. 14 may be at least one of configured or structured to perform operations/functions corresponding to portion(s) of machine-readable instructions at one or more of the same or different times.

In some examples, some or all of the circuitry of FIG. 4 may be instantiated, for example, in one or more threads executing at least one of concurrently or in series. For example, the microprocessor 1300 of FIG. 13 may execute machine-readable instructions in one or more threads executing at least one of concurrently or in series. In some examples, the FPGA circuitry 1400 of FIG. 14 may be at least one of configured or structured to carry out operations/functions at least one of concurrently or in series. Moreover, in some examples, some or all of the circuitry of FIG. 4 may be implemented within one or more virtual machines or containers executing on the microprocessor 1300 of FIG. 13.

In some examples, the programmable circuitry 1212 of FIG. 12 may be in one or more packages. For example, at least one of the microprocessor 1300 of FIG. 13 or the FPGA circuitry 1400 of FIG. 14 may be in one or more packages. In some examples, an XPU may be implemented by the programmable circuitry 1212 of FIG. 12, which may be in one or more packages. For example, the XPU may include a CPU (e.g., the microprocessor 1300 of FIG. 13, the CPU 1420 of FIG. 14, etc.) in one package, a DSP (e.g., the DSP 1422 of FIG. 14) in another package, a GPU in yet another package, and an FPGA (e.g., the FPGA circuitry 1400 of FIG. 14) in still yet another package.

While an example manner of implementing the second hardware communication circuitry 214 of FIG. 2 is illustrated in FIG. 4, one or more of the elements, processes, or devices illustrated in FIG. 4 may be combined, divided, re-arranged, omitted, eliminated, or implemented in any other way. Further, the example interface circuit 402, the example MMR bank 404, the example transmit queue 406, the example receive queue 408, the example clock control circuit 410, the first example hardware control circuit 414, the second example hardware control circuit 416, the example event trigger circuit 418, the example DMA interface 420, the example transmit shift register 422, the example receive shift register 424, or, more generally, the second example hardware communication circuitry 214 of FIG. 4, or the second example programmable processor circuit 216 may be implemented by hardware alone or by hardware in combination with software and firmware. Thus, for example, any of the example interface circuit 402, the example MMR bank 404, the example transmit queue 406, the example receive queue 408, the example clock control circuit 410, the first example hardware control circuit 414, the second example hardware control circuit 416, the example event trigger circuit 418, the example DMA interface 420, the example transmit shift register 422, the example receive shift register 424, or, more generally, the second example hardware communication circuitry 214 of FIG. 4, or the second example programmable processor circuit 216, could be implemented by programmable circuitry in combination with one or more machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), or field programmable logic device(s) (FPLD(s)) such as FPGAs. Further still, at least one of the second example hardware communication circuitry 214 or the second example programmable processor circuit 216 of FIG. 4 may include one or more elements, processes, or devices in addition to, or instead of, those illustrated in FIG. 4, or may include more than one of any or all of the illustrated elements, processes, and devices.

Flowchart(s) representative of example machine-readable instructions, which may be executed by programmable circuitry to at least one of implement or instantiate at least one of the second hardware communication circuitry 214 or the second programmable processor circuit 216 of FIG. 4 or representative of example operations which may be performed by programmable circuitry to at least one of implement or instantiate at least one of the second hardware communication circuitry 214 or the second programmable processor circuit 216 of FIG. 4, are shown in FIGS. 8 and 9. The machine-readable instructions may be one or more executable programs or portion(s) of one or more executable programs for execution by programmable circuitry such as the programmable circuitry 1212 shown in the example programmable circuitry platform 1200 described in connection with FIG. 12 and may be one or more function(s) or portion(s) of functions to be performed by the example programmable circuitry (e.g., an FPGA) described in connection with FIG. 13 or 14. In some examples, the machine-readable instructions cause an operation, a task, etc., to be carried out or performed in an automated manner in the real-world. As used herein, "automated" means without human involvement.

The program may be embodied in instructions (e.g., at least one of software or firmware) stored on at least on of one or more non-transitory computer-readable storage mediums or one or more machine-readable storage mediums such as one of or a combination of cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), or any other storage device or storage disk. The instructions of at least one of the non-transitory computer-readable medium or the non-transitory machine-readable medium may program or be executed by programmable circuitry located in one or more hardware devices, but the entire program or parts thereof could alternatively be executed or instantiated by one or more hardware devices other than the programmable circuitry or embodied in dedicated hardware. The machine-readable instructions may be distributed across multiple hardware devices or executed by two or more hardware devices (e.g., a server and a client hardware device). For example, the client hardware device may be implemented by an endpoint client hardware device (e.g., a hardware device associated with at least one of a human user or a machine user) or an intermediate client hardware device gateway (e.g., a radio access network (RAN)) that may facilitate communication between a server and an endpoint client hardware device. Similarly, the non-transitory computer-readable storage medium may include one or more mediums. Further, although the example program is described with reference to the flowchart(s) illustrated in FIGS. 8 and 9, many other methods of implementing at least one of the second example hardware communication circuitry 214 or the second example programmable processor circuit 216 may alternatively be used. For example, the order of execution of the blocks of the flowchart(s) may be changed, or some of the blocks described may be changed, eliminated, or combined. Also or alternatively, any or all of the blocks of the flow chart may be implemented by one or more hardware circuits (e.g., processor circuitry, discrete analog circuitry, discrete digital circuitry, integrated analog circuitry, integrated digital circuitry, an FPGA, an ASIC, a comparator, an operational-amplifier (op-amp), a logic circuit, etc.) structured to perform the corresponding operation without executing software or firmware. The programmable circuitry may be distributed in different network locations or local to one or more hardware devices (e.g., a single-core processor (e.g., a single core CPU), a multi-core processor (e.g., a multi-core CPU, an XPU, etc.)). For example, the programmable circuitry may be one of or a combination of a CPU or an FPGA located in the same package (e.g., the same integrated circuit (IC) package or in two or more separate housings), one or more processors in a single machine, multiple processors distributed across multiple servers of a server rack, multiple processors distributed across one or more server racks, etc., or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, or produce machine-executable instructions. For example, the machine-readable instructions may be fragmented and stored on one or more storage devices, disks, or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to render them directly readable, interpretable, or executable by a computing device or other machine. For example, the machine-readable instructions may be stored in multiple parts, which are individually compressed, encrypted, or stored on separate computing devices, where the parts when decrypted, decompressed, or combined form a set of one or more computer-executable or machine-executable instructions that implement one or more functions or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions or the corresponding program(s) can be executed in whole or in part. Thus, machine-readable, computer-readable, or machine-readable media, as used herein, may include one or a combination of instructions and program(s) regardless of the particular format or state of the machine-readable instructions or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8 and 9 may be implemented using executable instructions (e.g., at least one of computer-readable instructions or machine-readable instructions) stored on one or more non-transitory computer-readable or machine-readable media. As used herein, the terms non-transitory computer-readable medium, non-transitory computer-readable storage medium, non-transitory machine-readable medium, and non-transitory machine-readable storage medium are expressly defined to include any type of computer-readable storage device or storage disk and to exclude propagating signals and to exclude transmission media. Examples of such non-transitory computer-readable medium, non-transitory computer-readable storage medium, non-transitory machine-readable medium, or non-transitory machine-readable storage medium include one or more optical storage devices, magnetic storage devices, an HDD, a flash memory, a read-only memory (ROM), a CD, a DVD, a cache, a RAM of any type, a register, or any other storage device or storage disk in which information is stored for any duration (e.g., for extended time periods, permanently, for brief instances, for temporarily buffering, for caching of the information). As used herein, the terms "non-transitory computer-readable storage device" and "non-transitory machine-readable storage device" are defined to include any physical (mechanical, magnetic, electromechanical, or electrical) hardware to retain information for a time period, but to exclude propagating signals and to exclude transmission media. Examples of non-transitory computer-readable storage devices or non-transitory machine-readable storage devices include one or a combination of random-access memory of any type, read only memory of any type, solid state memory, flash memory, optical discs, magnetic disks, disk drives, or redundant array of independent disks (RAID) systems. As used herein, the term "device" refers to physical structure such as one of or a combination of mechanical, electromechanical, or electrical equipment, hardware, or circuitry that may or may not be configured by computer-readable instructions, machine-readable instructions, etc., or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. As used herein in the context of describing structures, components, items, objects and things, the phrase "at least one of A and B" refers to implementations including any of (1) at least one A, (2) at least one B, or (3) at least one A and at least one B. Similarly, as used herein in the context of describing structures, components, items, objects and things, the phrase "at least one of A or B" refers to implementations including any of (1) at least one A, (2) at least one B, or (3) at least one A and at least one B. As used herein in the context of describing the performance or execution of processes, instructions, actions, activities, etc., the phrase "at least one of A and B" refers to implementations including any of (1) at least one A, (2) at least one B, or (3) at least one A and at least one B. Similarly, as used herein in the context of describing the performance or execution of processes, instructions, actions, activities, etc., the phrase "at least one of A or B" refers to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Also, although individual features may be included in different examples or claims, these may be combined, and the inclusion in different examples or claims does not imply that a combination of features is at least one of not feasible or advantageous.

As used herein, connection references (e.g., attached, coupled, connected, and joined) may include intermediate members between the elements referenced by at least one of the connection reference or relative movement between those elements unless otherwise indicated. As such, connection references do not necessarily infer that two elements are directly connected or in fixed relation to each other.

Unless specifically stated otherwise, descriptors such as "first," "second," "third," etc., are used herein without imputing or otherwise indicating any meaning of priority, physical order, arrangement in a list, or ordering in any way, but are merely used as at least one of labels or arbitrary names to distinguish elements for ease of understanding the described examples. In some examples, the descriptor "first" may be used to refer to an element in the detailed description, while the same element may be referred to in a claim with a different descriptor such as "second" or "third." In such instances, such descriptors are used merely for identifying those elements distinctly within the context of the discussion (e.g., within a claim) in which the elements might, for example, otherwise share a same name.

As used herein, the phrase "in communication," including variations thereof, encompasses one of or a combination of direct communication or indirect communication through one or more intermediary components, and does not require direct physical (e.g., wired) communication or constant communication, but rather also includes selective communication at least one of periodic intervals, scheduled intervals, aperiodic intervals, or one-time events.

As used herein, "programmable circuitry" is defined to include at least one of (i) one or more special purpose electrical circuits (e.g., an application specific circuit (ASIC)) structured to perform specific operation(s) and including one or more semiconductor-based logic devices (e.g., electrical hardware implemented by one or more transistors), or (ii) one or more general purpose semiconductor-based electrical circuits programmable with instructions to perform one or more specific functions(s) or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations or functions, Field Programmable Gate Arrays (FPGAs) that may be programmed with second instructions to at least one of configure or structure the FPGAs to instantiate one or more operations or functions corresponding to the first instructions, Graphics Processor Units (GPUs) that may execute first instructions to perform one or more operations or functions, Digital Signal Processors (DSPs) that may execute first instructions to perform one or more operations or functions, XPUs, Network Processing Units (NPUs) one or more microcontrollers that may execute first instructions to perform one or more operations or functions or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., at least one of programmed or hardwired) at a time of manufacturing by a manufacturer to at least one of perform the function or be configurable (or re-configurable) by a user after manufacturing to perform the function or other additional or alternative functions. The configuring may be through at least one of firmware or software programming of the device, through at least one of a construction or layout of hardware components and interconnections of the device, or a combination thereof.

As used herein, the terms "terminal," "node," "interconnection," "pin," "line," and "lead" are used interchangeably. Unless specifically stated to the contrary, these terms are generally used to mean an interconnection between or a terminus of a device element, a circuit element, an integrated circuit, a device or other electronics or semiconductor component.

In the description and claims, described "circuitry" may include one or more circuits. A circuit or device that is described herein as including certain components may instead be adapted to be coupled to those components to form the described circuitry or device. For example, a structure described as including one or more semiconductor elements (such as transistors), one or more passive elements (such as one of or a combination of resistors, capacitors, or inductors), or one or more sources (such as at least one of voltage sources or current sources) may instead include only the semiconductor elements within a single physical device (e.g., at least one of a semiconductor die or integrated circuit (IC) package) and may be adapted to be coupled to at least some of the passive elements or the sources to form the described structure either at a time of manufacture or after a time of manufacture, for example, by at least one of an end-user or a third-party.

Circuits described herein are reconfigurable to include the replaced components to provide functionality at least partially similar to functionality available prior to the component replacement. Components shown as resistors, unless otherwise stated, are generally representative of any one or more elements coupled in at least one of series or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and some features illustrated as being internal to the integrated circuit may be incorporated outside of the integrated. As used herein, the term "integrated circuit" means one or more circuits that are at least one of: (i) incorporated in/over a semiconductor substrate; (ii) incorporated in a single semiconductor package; (iii) incorporated into the same module; or (iv) incorporated in/on the same printed circuit board.

Uses of the phrase "ground" in the foregoing description include at least one of a chassis ground, an Earth ground, a floating ground, a virtual ground, a digital ground, a common ground, or any other form of ground connection applicable to, or suitable for, the teachings of this description.

Modifications are possible in the described embodiments, and other embodiments are possible, within the scope of the claims.

From the foregoing, it will be appreciated that example systems, apparatus, articles of manufacture, and methods have been described that include atomic header update operations by hardware communication circuitry of a peripheral device without intervention from software. For example, once software writes into a virtual header register, example hardware communication circuitry flushes a transmit queue and transfers the header into the transmit queue from the on-chip interconnect bus as an atomic sequence. Examples described herein also include a commit flag and an ignore flag to facilitate reliable header updates from software executing on a peripheral device.

For example, according to examples described herein, software executing on a peripheral device can refresh or update a header multiple times as long as the commit flag is not set (e.g., is "0") while the CSN signal is not asserted. Advantageously, examples described herein include hardware communication circuitry to sense when the CSN signal is asserted (e.g., when the CSN signal transitions from high to low) and sets the commit flag. As such, example hardware communication circuitry rejects header updates from software executing on the peripheral device while the commit flag is set (e.g., to "1") and sets the ignore flag (e.g., to "1") to notify the software the header was not updated.

As described above, example virtual header registers described herein are implemented as aliased addresses and do not implement any flip-flops (or other physical storage) which saves area on chip. Also, as described above, examples described herein include a four-pin and five-pin implementation of a communication bus (e.g., an SPI communication bus). As such, example hardware communication circuitry described herein can transmit a data ready signal (e.g., bit-1 of the header) to a controller device via the POCI pin (e.g., in the four-pin implementation) or via the INT pin (e.g., in the five-pin implementation).

As described herein, example hardware communication circuitry signals the availability of data even before the full header is written to the transmit queue (e.g., which occurs over five clock cycles) and facilitates early assertion of the CSN signal by the controller device. When the CSN signal is asserted by the controller device, example hardware communication circuitry described herein triggers an interrupt for software executing on the peripheral device to write a payload to the transmit queue. Also, when the CSN signal is de-asserted by the controller device, example hardware communication circuitry described herein triggers an interrupt for software executing on the peripheral device to clear the commit flag which allows for a new header to be written.

Example systems, apparatus, articles of manufacture, and methods have been described that perform atomic header updates in hardware which avoids burdensome software-based approaches and reduces the latency associated with updating a header. For example, software-based approaches consume 20 clock cycles whereas examples described herein consume five clock cycles. Also, by implementing atomic header updates in hardware, examples described herein avoid the complexities of software-based approaches. For example, timing is very critical in software-based approaches, and it is difficult to meet timing requirements in software-based approaches. Conversely, as a result of example atomic header update sequencing described herein, the controller does not need to meet any special timing requirements to assert the CSN signal and transmit the PCLK signal. As such, examples described herein facilitate the use of hardware communication circuitry (that may be native to a peripheral device) and avoids the complexities of software-based approaches.

Also, as described above, example hardware communication circuitry signals the availability of data even before the full header is written to the transmit queue (e.g., which occurs over five clock cycles) which facilitates early assertion of the CSN signal by the controller device. This is advantageous at least because such data ready signaling allows example hardware communication circuitry to signal the controller device during periods of inactivity on the CSN signal (which may be as short as one cycle of the PCLK signal). Examples described herein also provide flexibility to choose between a four-pin implementation or a five-pin implementation of a communication bus for data ready signaling. For example, a four-pin implementation for data ready signaling is useful for low pin count devices and saves one pin on both a peripheral device and a controller device.

Example hardware communication circuitry described herein also includes example safety mechanisms to reject a header update (e.g., from software executing on the peripheral device) while active communication with the controller device is in progress (e.g., while the commit flag is set). Examples safety mechanisms also include accepting a header update only during idle state (e.g., while the commit flag is not set, while the chip select signal is not active). Examples described herein are fully verifiable, platform independent, and can be extended to other communication protocols such as the UART protocol.

Accordingly, examples described herein facilitate a peripheral device acting like a sensor node to update header data multiple times and provide the most up-to-date values to a controller device until communication has started. As described above, such updating is infeasible with software-based approaches due to the latency (e.g., 20 clock cycles) between a write transaction and the actual data being written to a communication bus with the controller device. Described systems, apparatus, articles of manufacture, and methods improve the efficiency of using a computing device at least by reducing the number of clock cycles consumed to at least one of write a header to or update a header stored in a transmit queue. Described systems, apparatus, articles of manufacture, and methods are also directed to one or more improvement(s) in the operation of a machine such as a computer or other electronic, electromechanical, or mechanical device.

What is claimed is:

1. A peripheral device comprising:

a peripheral out, controller in (POCI) pin configured to couple to a controller device; and a transmit buffer coupled to the POCI pin, wherein the peripheral device is configured to:

detect a write transaction for a header that is addressed to a register; and cause the header to be written to the transmit buffer in response to detecting the write transaction addressed to the register.

2. The peripheral device of claim 1, further comprising a chip select (CSN) pin, and wherein the peripheral device is configured to:

read a flag associated with the header transmit buffer;

based on a first value of the flag, cause the header to be written to the transmit buffer in response to detecting the write transaction addressed to the register; and set the flag to a second value in response to detecting that a signal on the CSN pin has been asserted.

3. The peripheral device of claim 2, wherein the header is a first header, and wherein the peripheral device is configured to cause a second header to not be written to the transmit buffer based on the second value of the flag.

4. The peripheral device of claim 1, wherein to cause the header to be written to the transmit buffer, the peripheral device is configured to cause an interface circuit to transfer the header from an interconnect bus to the transmit buffer.

5. The peripheral device of claim 1, further comprising an interrupt (INT) pin, and wherein the peripheral device is configured to:

tri-state the POCI pin; and transmit a data ready signal on the INT pin in response to detecting the write transaction addressed to the register, the data ready signal to indicate that the header is available.

6. The peripheral device of claim 1, further comprising a chip select (CSN) pin, and wherein the peripheral device is configured to, while a signal on the CSN pin is not asserted, transmit a data ready signal on the POCI pin in response to detecting the write transaction addressed to the register, the data ready signal to indicate that the header is available.

7. The peripheral device of claim 1, further comprising a chip select (CSN) pin, wherein the peripheral device is configured to write a payload to the transmit buffer in response to detecting that a signal on the CSN pin has been asserted, and wherein the payload corresponds to the header.

8. A method comprising:

detecting, in a peripheral device, a write transaction for a header that is addressed to a register; and causing the header to be written to a transmit buffer in the peripheral device in response to detecting the write transaction addressed to the register, wherein the transmit buffer is coupled to a peripheral out, controller in (POCI) pin.

9. The method of claim 8, further comprising:

reading a flag associated with the transmit buffer;

based on a first value of the flag, causing the header to be written to the transmit buffer in response to detecting the write transaction addressed to the register; and setting the flag to a second value in response to detecting that a signal on a chip select pin has been asserted.

10. The method of claim 9, wherein the header is a first header, and the method further comprising causing a second header to not be written to the transmit buffer based on the second value of the flag.

11. The method of claim 8, wherein causing the header to be written to the transmit buffer comprises causing an interface circuit to transfer the header from an interconnect bus to the transmit buffer.

12. The method of claim 8, further comprising:

tri-stating the POCI pin; and transmitting a data ready signal on an interrupt pin in response to detecting the write transaction addressed to the register, the data ready signal to indicate that the header is available.

13. The method of claim 8, further comprising, while a signal on a chip select pin is not asserted, transmitting a data ready signal on the POCI pin in response to detecting the write transaction addressed to the register, the data ready signal to indicate that the header is available.

14. The peripheral device of claim 1, further comprising a register bank, wherein the register is a virtual register in the register bank, and wherein the peripheral device is configured to:

detect that the write transaction is addressed to the virtual register; and cause the header to be written to the transmit buffer in response to detecting that the write transaction is addressed to the virtual register.

15. The peripheral device of claim 14, wherein the virtual register does not exist as a physical register in the register bank.

16. The peripheral device of claim 1, wherein the peripheral device is configured to:

detect that the write transaction includes an aliased address; and cause the header to be written to the transmit buffer in response to detecting that the write transaction includes the aliased address.

17. The method of claim 8, wherein the register is a virtual register, wherein detecting the write transaction comprises detecting that the write transaction is addressed to the virtual register, and wherein causing the header to be written comprises causing the header to be written to the transmit buffer in response to detecting that the write transaction is addressed to the virtual register.

18. The method of claim 17, wherein the virtual register does not exist as a physical register.

19. The method of claim 8, wherein detecting the write transaction comprises detecting that the write transaction includes an aliased address, and wherein causing the header to be written comprises causing the header to be written to the transmit buffer in response to detecting that the write transaction includes the aliased address.

20. A device comprising:

a chip select (CSN) pin;

a peripheral out, controller in (POCI) pin; and a transmit buffer coupled to the POCI pin, wherein the device is configured to:

detect a write transaction for a header that includes an aliased address;

cause the header to be written to the transmit buffer in response to detecting that the write transaction includes the aliased address; and transmit the header on the POCI pin in response to a signal on the CSN pin being asserted.

* * * * *